United States Patent
Nakano et al.

(10) Patent No.: US 9,530,558 B2
(45) Date of Patent: Dec. 27, 2016

(54) ENERGY RECEIVER, DETECTION METHOD, POWER TRANSMISSION SYSTEM, DETECTION DEVICE, AND ENERGY TRANSMITTER

(75) Inventors: Hiroaki Nakano, Tokyo (JP); Shinichi Fukuda, Kanagawa (JP); Yuji Murayama, Tokyo (JP); Kenichi Fujimaki, Kanagawa (JP); Tomomichi Murakami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 223 days.

(21) Appl. No.: 14/126,969

(22) PCT Filed: Jul. 2, 2012

(86) PCT No.: PCT/JP2012/067759
§ 371 (c)(1),
(2), (4) Date: Dec. 17, 2013

(87) PCT Pub. No.: WO2010/005860
PCT Pub. Date: Jan. 10, 2013

(65) Prior Publication Data
US 2014/0125287 A1      May 8, 2014

(30) Foreign Application Priority Data

Jul. 5, 2011   (JP) ................. 2011-149465

(51) Int. Cl.
*H01F 38/14* (2006.01)
*H02J 7/02* (2016.01)
(Continued)

(52) U.S. Cl.
CPC ............... *H01F 38/14* (2013.01); *H02J 5/005* (2013.01); *H02J 7/025* (2013.01); *G01V 3/101* (2013.01); *H02J 50/10* (2016.02); *H02J 50/60* (2016.02)

(58) Field of Classification Search
CPC ..................... H02J 7/025; H04B 5/0037
(Continued)

(56) References Cited

U.S. PATENT DOCUMENTS 8,368,359 B2 *  2/2013  Chen ................ H02J 7/0029
                                                            307/43
2007/0228833 A1 * 10/2007 Stevens ............... H02J 5/005
                                                            307/45

(Continued)

FOREIGN PATENT DOCUMENTS

DE    102009 033236 A1    1/2011
EP        2017940 A2      1/2009
(Continued)

OTHER PUBLICATIONS

Japanese Office Action issued in connection with related Japanese Application No. 2012-140477 dated Oct. 22, 2013.
(Continued)

*Primary Examiner* — Samuel Berhanu
*Assistant Examiner* — Tarikh Rankine
(74) *Attorney, Agent, or Firm* — Dentons US LLP

(57) ABSTRACT

An energy receiver includes: a power receiver coil configured to wirelessly receive power transmitted from a power transmitter; a detection section configured to detect a foreign object; and a power storage section configured to supply power to the detection section during detection of the foreign object.

22 Claims, 16 Drawing Sheets

(51) Int. Cl.
*H02J 17/00* (2006.01)
*H02J 5/00* (2016.01)
*G01V 3/10* (2006.01)

(58) Field of Classification Search
USPC .......................................... 320/108; 307/104
See application file for complete search history.

(56) References Cited

U.S. PATENT DOCUMENTS

| | | | | |
|---|---|---|---|---|
| 2009/0001932 | A1 | 1/2009 | Kamijo et al. | |
| 2009/0021219 | A1* | 1/2009 | Yoda .................. | H02J 7/0011 320/137 |
| 2010/0013322 | A1* | 1/2010 | Sogabe ................ | H04B 5/0093 307/104 |
| 2011/0074346 | A1* | 3/2011 | Hall ..................... | B60L 3/00 320/108 |
| 2012/0001493 | A1* | 1/2012 | Kudo .................... | H02J 5/005 307/104 |
| 2012/0175967 | A1* | 7/2012 | Dibben ................. | H02J 5/005 307/104 |
| 2012/0326662 | A1* | 12/2012 | Matsumoto ........... | H02J 7/025 320/108 |

FOREIGN PATENT DOCUMENTS

| | | |
|---|---|---|
| EP | 2573902 A2 | 3/2013 |
| JP | 2003-054898 | 2/2003 |
| JP | 2008-206231 | 9/2008 |
| JP | 2008-236917 | 10/2008 |
| JP | 2009-267572 | 11/2009 |
| JP | 2010-11588 | 1/2010 |
| JP | 2010-119246 | 5/2010 |
| JP | 2010-136464 | 6/2010 |
| JP | 2010-154669 | 7/2010 |
| JP | 2010-252498 | 11/2010 |
| JP | 2010-252624 | 11/2010 |
| JP | 2011-019373 | 1/2011 |
| JP | 2011-036125 | 2/2011 |
| JP | 2011-61893 | 3/2011 |
| JP | 2011-081475 | 4/2011 |
| JP | 2001-275280 | 10/2011 |
| JP | 2012-16125 | 1/2012 |
| JP | 2012-016171 | 1/2012 |
| JP | 2012-055109 | 3/2012 |
| JP | 2012-065477 | 3/2012 |
| JP | 2012-65477 | 3/2012 |
| WO | WO/2006/101285 A1 | 9/2006 |
| WO | WO 2011/010375 A1 | 1/2011 |

OTHER PUBLICATIONS

Supplementary European Search Report issued in connection with related EP Application No. EP 1280 8131 dated Apr. 1, 2015.
Japanese Office Examination issued in connection with related Japanese patent application No. 2012-140477 dated May 27, 2014.

* cited by examiner (1) METAL AT CENTER (2) METAL LATERALLY-SHIFTED BY 50 mm (3) METAL AT COIL CORNER

ENERGY RECEIVER, DETECTION METHOD, POWER TRANSMISSION SYSTEM, DETECTION DEVICE, AND ENERGY TRANSMITTER

TECHNICAL FIELD

The present disclosure relates to a detector detecting presence of a conductor such as a metal, a power receiver, a power transmitter, a non-contact power transmission system, and a detection method. In particular, the present disclosure relates to an energy receiver, a detection method, a power transmission system, a detection device, and an energy transmitter.

BACKGROUND ART

In recent years, a non-contact power transmission system supplying power by wireless, that is, without contact is actively developed. A magnetic field resonance method attracts attention as a method realizing non-contact power transmission. The magnetic field resonance method uses magnetic field coupling between a transmission-side coil and a reception-side coil to perform power transmission. The magnetic field resonance method has characteristics that magnetic fluxes shared between a power feed source and a power feed destination is reduced by actively using resonance phenomenon.

In a well-known electromagnetic induction method, the coupling degree of the power transmission side and the power reception side is distinctly high, and power feeding with high efficiency is possible. However, since a coupling factor need to be maintained high, power transmission efficiency between a power transmission side coil and a power reception side coil (hereinafter, referred to as "efficiency between coils") is largely deteriorated when a distance between the power transmission side and the power reception side is increased or when positional deviation occurs. On the other hand, the magnetic field resonance method has characteristics that the efficiency between coils is not deteriorated, even if a coupling factor is small, if a quality factor is high. In other words, there is an advantage that an axial alignment between the power transmission side coil and the power reception side coil is not necessary and degree of freedom in position and distance between coils is high. The quality factor is an index indicating relationship between retention and loss of energy in a circuit having the power transmission side coil or the power reception side coil (indicating intensity of resonance of a resonance circuit).

One of the most important factors in the non-contact power transmission system is measures against heat generation of a foreign metal. When power feeding is performed without contact, if a metal exists between the power transmission side and the power reception side, an eddy current occurs and thus the metal may generate heat, irrespective of the electromagnetic induction method or the magnetic field resonance method. To suppress the heat generation, various methods of detecting a foreign metal are proposed. For example, a method using an optical sensor or a temperature sensor is known. However, a detection method using a sensor is high in cost when feeding range is wide like the magnetic field resonance method. In addition, for example, if the used sensor is a temperature sensor, output results of the temperature sensor depend on heat conductivity therearound so that devices on the transmission side and the reception side are limited in design.

Accordingly, a method of observing change in parameters (a current, a voltage, and the like) when a foreign metal exists between the power transmission side and the power reception side and determining presence of a foreign metal is proposed. In such a method, its cost is allowed to be suppressed without design limitation. For example, in Patent Literature 1, a method of detecting a foreign metal with use of modulation degree of parameters at communication between the power transmission side and the power reception side is proposed. In Patent Literature 2, a method of detecting a foreign metal with use of eddy current loss (detection of foreign substance by DC-DC efficiency) is proposed.

CITATION LIST

Patent Literature

PTL 1: Japanese Patent Application Unexamined Publication No. 2008-206231
PTL 2: Japanese Patent Application Unexamined Publication No. 2001-275280

SUMMARY OF INVENTION

However, in the methods proposed in Patent Literatures 1 and 2, influence of a metal housing on the power reception side is not considered. In the case of charging to general mobile devices, any metal (metal housings, metallic parts, and the like) is likely to be used in the mobile devices, and thus it is difficult to determine whether the change of the parameters is caused by "influence of the metal housing and the like" or by "a contained foreign metal". In Patent Literature 2 as an example, it is difficult to determine whether the eddy current loss is caused by a metal housing in a mobile device or by a foreign metal existing between a power transmission side and a power reception side. As described above, the methods proposed in Patent Literatures 1 and 2 do not detect a foreign metal with high accuracy.

In addition, typically, a mobile device includes a battery for charging power received without contact and a control circuit appropriately controlling the battery. However, when a detection circuit detecting a foreign metal is operated by using power charged in the battery in the mobile device, the mobile device is necessary to control the detection circuit while appropriately controlling the battery, and thus load related to the control is large.

Moreover, when the remaining battery charge is little, it is difficult for the mobile device to detect a foreign metal existing between the mobile device and the power transmission side. If detection of a foreign metal is not performed, power transmission from the power transmission side is not performed because safety is not ensured, and thus the battery is not charged.

It is desirable to detect a foreign metal existing between a power transmission side and a power reception side and to improve detection accuracy, without loading a system (control) on the power reception side.

According to an embodiment of the disclosure, there is provided an energy receiver including: a power receiver coil configured to wirelessly receive power transmitted from a power transmitter; a detection section configured to detect a foreign object; and a power storage section configured to supply power to the detection section during detection of the foreign object.

According to an embodiment of the disclosure, there is provided a detection method including: charging a power storage section using power wirelessly received from a power receiver coil; detecting whether a foreign object is within a range of the power receiver coil using a detection section; and powering the detection section during detection of the foreign object using the power storage section.

According to an embodiment of the disclosure, there is provided a power transmission system including: a power transmitter configured to wirelessly transmit power to a power receiver, wherein, the power transmitter includes (i) a power transmission coil configured to transmit power to the power receiver, (ii) a power transmission section configured to supply an AC signal to the power transmission coil, and (iii) a power transmitter control section configured to control the supply of the AC signal from the power transmission section in response to a signal transmitted from the power receiver, and the power receiver includes (i) a power receiver coil configured to wirelessly receive power from the power transmitter, (ii) a detection section configured to detect a foreign object, (iii) a power storage section configured to store the power received from the power transmitter, the power storage section operable to supply the power received to the detection section during detection of the foreign object, and (iv) a power receiver control section configured to operate the detection section and determine whether the foreign object is within a range of the power transmission coil.

According to an embodiment of the disclosure, there is provided a detection device including: a power receiver coil configured to wirelessly receive power transmitted from a power transmitter; a detection section configured to detect whether a foreign object is within a range of the power receiver coil; and a power storage section configured to supply power to the detection section during detection of the foreign object.

According to an embodiment of the disclosure, there is provided an energy transmitter including: a power transmission coil configured to wirelessly transmit power to a power receiver; a detection section configured to detect a foreign object; and a power storage section configured to supply power to the detection section during detection of the foreign object.

According to an embodiment of the disclosure, there is provided an energy receiver including: a power receiver coil configured to wirelessly receive power transmitted from a power transmitter; a detection section configured to detect a foreign object; and a control section configured to activate the detection section during suspension of power transmission to the power receiver coil.

According to one embodiment of the disclosure, there is provided a detector including: a resonance circuit including a secondary-side coil; a detection section measuring a quality factor of the resonance circuit; a power storage section charging power, from power received through the secondary-side coil from a primary-side coil, by an amount of power consumed during the quality factor measurement in the detection section; and a control section operating the detection section, during suspension of power transmission from the primary-side coil, with use of the power charged in the power storage section.

According to one embodiment of the disclosure, there is provided a power receiver including: a secondary-side coil; a resonance circuit including the secondary-side coil; a detection section measuring a quality factor of the resonance circuit; a power storage section charging power, from power received through the secondary-side coil from a primary-side coil, by an amount of power consumed during the quality factor measurement in the detection section; and a control section operating the detection section, during suspension of power transmission from the primary-side coil, with use of the power charged in the power storage section.

According to one embodiment of the disclosure, there is provided a power transmitter including: a primary-side coil transmitting power to a secondary-side coil; a power transmission section supplying an AC signal to the primary-side coil; and a control section controlling the supply of the AC signal from the power transmission section in response to a signal indicating an electromagnetic coupling state based on a quality factor of a power receiver, the signal being transmitted from the power receiver mounted with the secondary-side coil.

According to one embodiment of the disclosure, there is provided a non-contact power transmission system including: a power transmitter transmitting power by wireless; and a power receiver receiving the power transmitted from the power transmitter. The power receiver includes: a resonance circuit including a secondary-side coil; a detection section measuring a quality factor of the resonance circuit; a power storage section charging power, from power received through the secondary-side coil from a primary-side coil, by an amount of power consumed during the quality factor measurement in the detection section; and a first control section operating the detection section, during suspension of power transmission from the primary-side coil, with use of the power charged in the power storage section. The power transmitter includes: the primary-side coil transmitting power to the secondary-side coil of the power receiver; a power transmission section supplying an AC signal to the primary-side coil; and a second control section controlling the supply of the AC signal from the power transmission section in response to a signal indicating an electromagnetic coupling state based on a quality factor of the power receiver, the signal being transmitted from the power receiver.

According to one embodiment of the disclosure, there is provided a detection method including: charging power, in a power storage section of a power receiver in a non-contact power transmission system, by an amount of power consumed during quality factor measurement in a detection section of the power receiver, from power received from a primary-side coil of a power transmitter through a secondary-side coil of a resonance circuit, the resonance circuit being provided in the power receiver; operating the detection section and acquiring a physical amount necessary for determining a quality factor of the resonance circuit, during suspension of power transmission from the primary-side coil, with use of the power charged in the power storage section; and calculating the quality factor from the physical amount necessary for determining the quality factor, by the power receiver or the power transmitter in the non-contact power transmission system.

According to the above-described example embodiments of the disclosure, even when power feeding is not performed from the power transmission side to the power reception side, by using the power by an amount of power consumed during quality factor measurement stored in the power storage section and disconnecting a circuit for detecting a foreign metal from a system on the power reception side, a foreign metal existing between the power transmission side and the power reception side is detectable. Moreover, the detection of a foreign metal is performed by measuring the secondary-side quality factor while power feeding is not performed from the power transmission side to the power reception side. Accordingly, the detection of a foreign metal is not affected by power feeding, and detection accuracy is improved.

DESCRIPTION OF EMBODIMENTS

Figure 1:
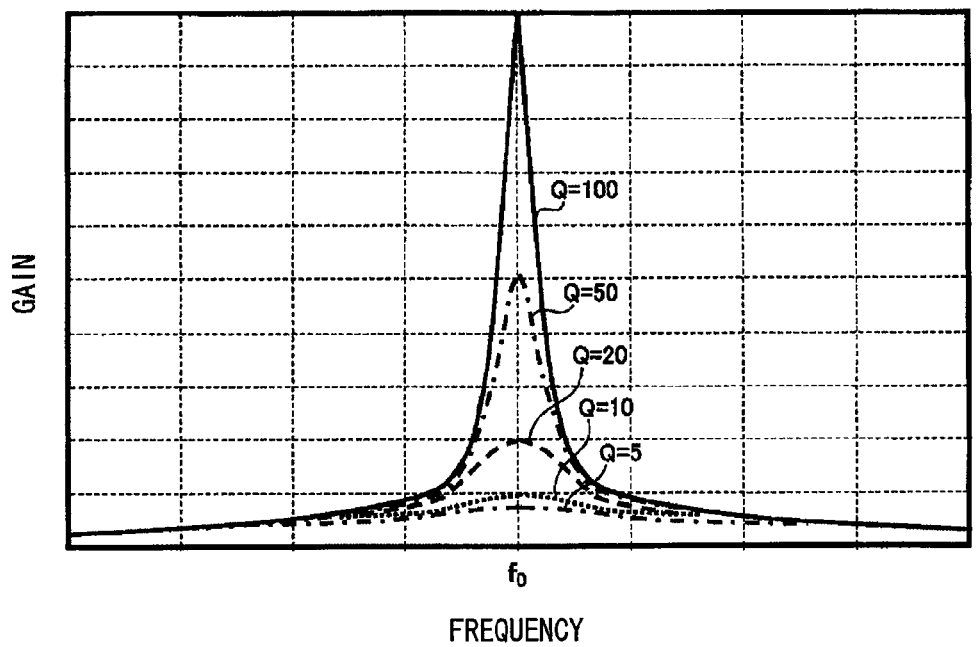
FIG. 1 is a graph illustrating an example of a frequency characteristic of a gain when a quality factor of a serial resonance circuit is changed.

Embodiments of the present disclosure will be described below referring to the accompanying drawings. Descriptions will be given in the following order. Note that the same numerals are used to designate common components in the drawings, and the overlapping description will be appropriately omitted.

1. First Embodiment (first to third switch sections: example of switching circuit between during power feeding and during quality factor measurement)

2. Second Embodiment (arithmetic processing section: example of calculating quality factor by half bandwidth method)

3. Third Embodiment (arithmetic processing section: example of calculating quality factor with use of ratio of real component and imaginary component of impedance)

4. Others (various modifications)

1. First Embodiment

[Introduction Description]

The inventors have studied detection of a foreign metal with use of a change in a power-reception side quality factor (a secondary side), in order to solve the above-described issue. The foreign metal means a conductor such as a metal existing between a power transmission side (a primary side) and the power reception side. The conductor described in this specification includes a conductor in the broad sense, that is, a semiconductor.

The quality factor is an index indicating a relationship between energy retention and energy loss, and is generally used as a value indicating a sharpness of a resonance peak (intensity of resonance) of a resonance circuit. In a serial resonance circuit using a coil and a capacitor (also referred to as a condenser), the quality factor is generally expressed by an expression (1), where R is a resistance value of the serial resonance circuit, L is an inductance value, and C is a capacitance value.

[Numerical Expression 1]

$$Q = \frac{1}{R}\sqrt{\frac{L}{C}} \quad (1)$$

FIG. 1 is a graph illustrating an example of frequency characteristics of a gain with the quality factor of the serial resonance circuit being changed.

When the quality factor is changed between 5 and 100 as an example, sharpness of the peak in the frequency characteristics of the gain is increased as the quality factor is increased. Moreover, it is known that the resistance value R and the inductance value L illustrated in the expression (1) are changed by approach of a foreign metal or influence of an eddy current generated in the foreign metal. Specifically, the quality factor and the resonance frequency of the resonance circuit are largely changed by the influence of the foreign metal around the coil.

Next, power transmission efficiency between a primary-side coil and a secondary-side coil (efficiency between coils) in a non-contact power transmission system in a magnetic field resonance method will be described.

It is known that a maximum theoretical value $\eta_{max}$ of the efficiency between coils is expressed by an expression (2).

[Numerical Expression 2]

$$\eta_{max} = \frac{S^2}{\left(1 + \sqrt{1+S^2}\right)^2} \quad (2)$$

Herein, S and Q are expressed by the following expressions.

[Numerical Expression 3]

$$S = kQ \quad (3)$$

[Numerical Expression 4]

$$Q = \sqrt{Q_1 Q_2} \quad (4)$$

Q indicates a quality factor in the entire non-contact power transmission system, $Q_1$ indicates a primary-side quality factor, and $Q_2$ indicates a secondary-side quality factor. In other words, in the magnetic field resonance method, the efficiency between coils $\eta_{max}$ is theoretically and uniquely determined from a coupling factor k, the primary-side quality factor ($Q_1$), and the secondary-side quality factor ($Q_2$). The coupling factor k is a degree of magnetic coupling between the primary-side coil and the secondary-side coil. The quality factors $Q_1$ and $Q_2$ are quality factors in a resonance circuit without load. Accordingly, when the quality factors both on the power transmission side and the power reception side are high even if the coupling factor k is low, power transmission is allowed to be performed with high efficiency.

Figure 2:
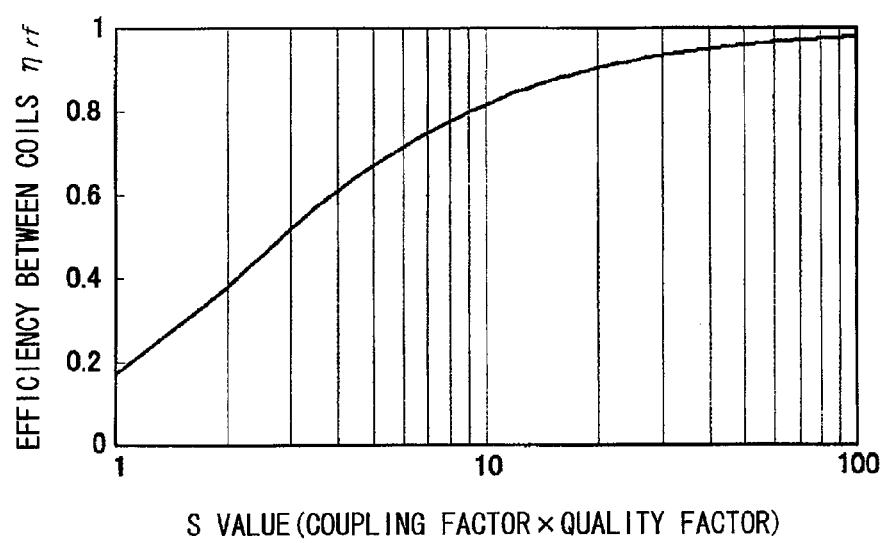
FIG. 2 is a graph illustrating a relationship between an S value (a coupling factor×a quality factor) and efficiency between coils.

A relationship between an S value (coupling factor× quality factor) and the efficiency between coils $\eta_{max}$ is illustrated in FIG. 2.

In the magnetic field resonance method, even if the coupling factor k is low, the primary-side quality factor and the secondary-side quality factor of the resonance circuit are made high to increase degree of freedom in arrangement of the primary-side coil and the secondary-side coil. As an example, the design is made on the assumption that the coupling factor k between the primary-side coil and the secondary-side coil is equal to or smaller than 0.5, and the quality factor of one or both of the primary-side coil and the secondary-side coil is equal to or larger than 100. The same applies to second and third embodiments which will be described later.

In the magnetic field resonance method, a coil having a high quality factor to some extent is used for power feeding so that the degree of freedom in the arrangement of the primary-side coil and the secondary-side coil is increased. Similarly to the typical resonance circuit described above, however, the quality factor and the resonance frequency are largely changed due to influence of a metal.

Figure 3A:
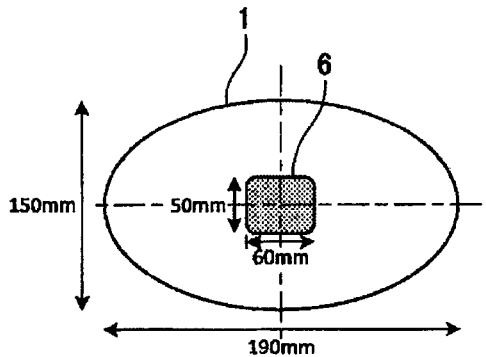
FIGS. 3A to 3C are schematic diagrams explaining measurement conditions when a primary-side quality factor is measured with a position of a metal being changed.
Figure 3B:
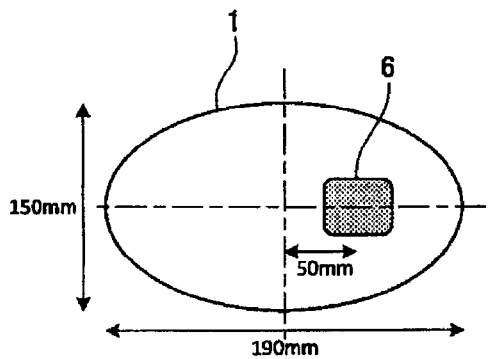
Figure 3C:
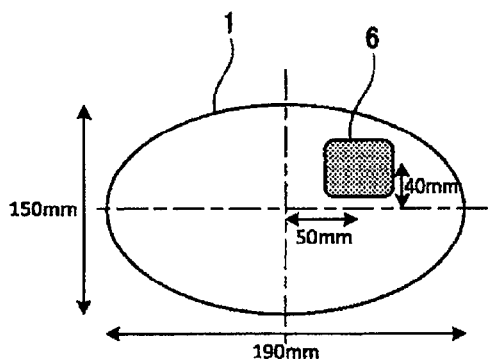

FIGS. 3A to 3C illustrate measurement conditions of primary-side quality factor measurement with various metal positions.

In the measurement, a spiral coil used as a primary-side coil 1 had a size of 150 mm (vertical)×190 mm (horizontal). The spiral coil was obtained by winding a litz wire (wire diameter φ is 1.0 mm) which is a twisted conductive wire of a plurality of thin copper wires. A metal piece 6 having a size of 50 mm (vertical)×60 mm (horizontal)×0.05 mm (thickness) was used on the secondary side in place of a metal housing. Two metal pieces 6 made of aluminum or stainless steel were prepared. The measurement was carried out on three cases, namely, (1) a case where the metal piece 6 was located on the center of the primary-side coil 1 (FIG. 3A), (2) a case where the metal piece 6 was located at (moved to) a position shifted from the center in a horizontal direction (FIG. 3B), and (3) a case where the metal piece 6 was located on an end of the primary-side coil 1 (FIG. 3C).

The measurement results of the primary-side quality factor depending on the metal position are illustrated in Table 1.

TABLE 1

| | | Kind of Metal | | | | | |
| --- | --- | --- | --- | --- | --- | --- | --- |
| | | Aluminum | | | Stainless Steel | | |
| | | Metal Position | | | | | |
| | No metal | (1) | (2) | (3) | (1) | (2) | (3) |
| Primary-Side Quality factor | 212.9 | 174.8 | 151.1 | 173.1 | 55.45 | 47.21 | 89.33 |

It is confirmed from the measurement results illustrated in Table 1 that the primary-side quality factor is largely changed depending on the position of the metal piece 6 viewed from the primary side and the metal material. It is obvious from the above-described expressions (1) to (3) that the primary-side quality factor largely affects the efficiency between coils (eddy current loss). Therefore, it is found that variation of influence degree of a metal housing is dominant to the reduction of the efficiency between coils (increase of eddy current loss) rather than a small foreign metal, and detection of a small foreign metal is difficult. In other words, the primary-side quality factor is largely changed depending on the secondary side (in which the metal position mounted in the housing is considered to be different). Therefore it is difficult to determine whether the change in the quality factor is caused by a mixed foreign substance or by influence of a metal housing on the secondary side.

On the other hand, as viewed from the secondary-side coil, a positional relationship between the secondary-side coil and the metal housing does not change at all, and there is a no correlation in a positional relationship between the primary-side coil and the secondary-side coil. Specifically, although the quality factor of the secondary-side coil is also decreased by influence of the metal housing, if a large foreign metal does not exist near the primary-side coil, the secondary-side quality factor is constant irrespective of the positional relationship and efficiency.

Typically, a mobile device such as a mobile phone and a digital still camera is assumed as the device on the power reception side. In such a mobile device, for maintaining strength or performing main other functions such as phone call or imaging, it is difficult to eliminate metals from the device main body. However, since the main purpose of the primary-side coil is possibly charging, there is a possibility that the device main body on the power transmission side has a configuration without influence of metals. In such a case, the secondary-side quality factor has a constant value, and is largely changed only by approach of a foreign metal.

The change degree of the secondary-side quality factor caused by a foreign metal was measured, and the results are illustrated in Table 2.

TABLE 2

| Metal Position | Ls Value | Rs Value | Quality Factor | Change Amount |
|---|---|---|---|---|
| None | 61.93 | 581 | 80.3 | 0 |
| Center | 61.79 | 779 | 59.77 | 25.56663 |
| Right 5 mm | 61.84 | 826 | 56.45 | 29.70112 |
| Right 10 mm | 62.46 | 1054 | 44.69 | 44.3462 |
| Right 15 mm | 62.82 | 1071 | 44.21 | 44.94396 |
| Bottom 5 mm | 61.8 | 803 | 58 | 27.77086 |
| Bottom 10 mm | 61.91 | 909 | 51.32 | 36.08966 |
| Bottom 15 mm | 62.41 | 1082 | 43.49 | 45.8406 |
| Bottom 20 mm | 62.74 | 1015 | 46.61 | 41.95517 |
| Lower Right 5 mm | 61.89 | 869 | 53.7 | 33.12578 |
| Lower Right 10 mm | 62.7 | 1111 | 42.5 | 47.07347 |

Table 2 illustrates the measured change amount of the secondary-side quality factor when an iron piece having a size of 10 mm square and a thickness of 1.0 mm is approached to a coil having an external size of 40 mm×50 mm and an internal size of 20 mm×30 mm. An "Ls value" indicates an inductance value of the coil, an "Rs value" indicates an effective resistance value of the resonance circuit at the frequency f, and a "change amount" indicates a change amount with reference to a quality factor without iron. Although the change amount of the quality factor depends on the position of the iron piece, the quality factor is changed (lowered) by at least 25% compared with a case without iron (when the metal piece is located at the center).

In this way, the change of the secondary-side quality factor is possibly used for detection of a foreign metal. In other words, it is conceivable that setting of a threshold with respect to the change amount of the quality factor enables detection of a foreign metal. However, as described in "Summary of Invention", when a quality factor is measured with use of power received from a power transmission side, there is a difficulty in which a quality factor is not precisely measured due to an influence of the power received from the power transmission side, for example. To use the change of the quality factor for detection of a foreign metal, a measurement method needs to be devised. Hereinafter, a method of measuring a quality factor according to the disclosure will be described.

[Principle of Quality Factor Measurement]

Figure 4:
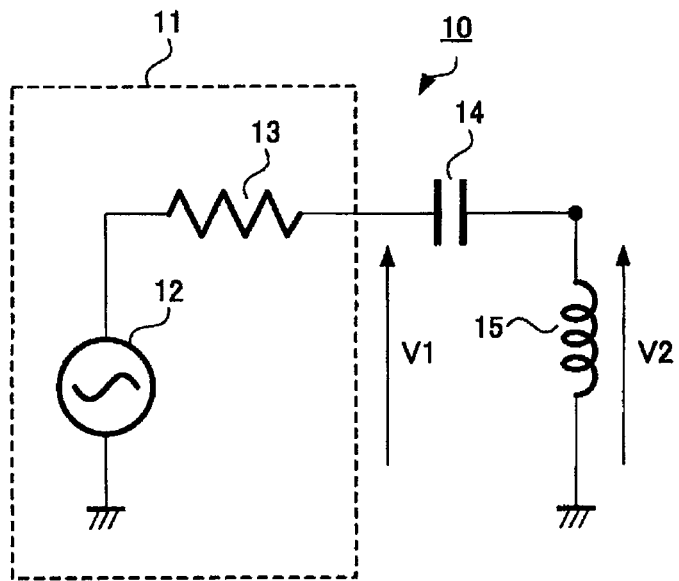
FIG. 4 is a circuit diagram illustrating an outline of a power transmitter used in a non-contact power transmission system according to a first embodiment of the disclosure.

The principle of a quality factor measurement is described referring to FIG. 4.

FIG. 4 is a circuit diagram illustrating an outline of a power transmitter used in a non-contact power transmission system, according to a first embodiment of the disclosure. The circuit of a power transmitter 10 illustrated in FIG. 4 is an example of a most basic circuit configuration (in magnetic field coupling) illustrating the measurement principle of the primary-side quality factor. Although a circuit including a serial resonance circuit is illustrated, various embodiments of a detailed configuration are available as long as the circuit has a function of a resonance circuit. The quality factor measurement of the resonance circuit uses a method which is also used in measurement instruments (LCR meter). Incidentally, although the circuit illustrated in FIG. 4 is an example of a resonance circuit of the power transmitter (on the primary side), the same measurement principle applies to a resonance circuit of a power receiver (on the secondary side).

For example, when a metal piece exists near a primary-side coil 15 of the power transmitter 10, lines of magnetic force pass through the metal piece to generate an eddy current in the metal piece. As viewed from the primary-side coil 15, it seems like that the metal piece electromagnetically couples with the primary-side coil 15, and the primary-side coil 15 has an actual resistance load, resulting in change of the primary-side quality factor. Measuring of the quality factor leads to detection of a foreign metal (in an electromagnetically-coupled state) near the primary-side coil 15.

The power transmitter 10 in the embodiment includes a signal source 11, a capacitor 14, and the primary-side coil 15 (a power transmission coil, an example of a coil). The signal source 11 includes an AC power source 12 generating an AC signal (a sine wave) and a resistance element 13. The resistance element 13 indicates an internal resistance (output impedance) of the AC power source 12 in illustration. The capacitor 14 and the primary-side coil 15 are connected to the signal source 11 to form a serial resonance circuit (an example of a resonance circuit). A capacitance value (C value) of the capacitor 14 and an inductance value (L value) of the primary-side coil 15 are adjusted in order to resonate at a frequency to be measured. A power transmission section including the signal source 11 and the capacitor 14 uses a load modulation system or the like to transmit power to the outside with no contact through the primary-side coil 15.

When a voltage between the primary-side coil 15 and the capacitor 14 which configure the serial resonance circuit is V1 (an example of a voltage applied to the resonance circuit) and a voltage between both ends of the primary-side coil 15 is V2, the quality factor of the serial resonance circuit is expressed by an expression (5).

[Numerical Expression 5]

$$Q = \frac{V2}{V1} = \frac{2\pi fL}{r_s} \quad (5)$$

where $r_s$ is an effective resistance value at the frequency f.

The voltage V2 is obtained by multiplying the voltage V1 by Q. As the metal piece approaches the primary-side coil 15, the effective resistance value $r_s$ is increased and the quality factor is decreased. In this way, when the metal piece approaches the primary-side coil 15, the quality factor to be measured (in the electromagnetically-coupled state) is changed. By detecting the change, the metal piece existing near the primary-side coil 15 is detectable.

The above-described measurement principle is applied to the power receiver (on the secondary side) to allow the power receiver to measure the quality factor. However, if the power feeding is performed during the quality factor measurement, large power is generated in the coil of the power receiver due to the magnetic field output from the power transmission side, and thus the voltage V2 is not normally measured. Accordingly, the quality factor is not obtained precisely, which results in less-accurate detection of a foreign metal.

To solve the above-described disadvantage, power feeding needs to be suspended during the measurement. However, if the power feeding is stopped, a large battery operating the circuit for measuring the secondary-side quality factor is necessary. In addition, when a battery is mounted on the power receiver as the other measure, a product life is affected thereby, and detection of a foreign metal is not performed when the battery of the mobile device is empty and charging is necessary immediately.

Accordingly, the inventors invent an electromagnetic coupling state detection technology without a battery, in which the quality factor measurement is performed on the secondary side with use of the power supplied from the primary side, whereas the secondary side does not perform the quality factor measurement at the time of receiving power from the primary side.

[Configuration of First Embodiment]

(Configuration Example of Power Transmitter)

The configuration example of the power transmitter (on the primary side) according to the first embodiment of the disclosure is described.

Figure 5:
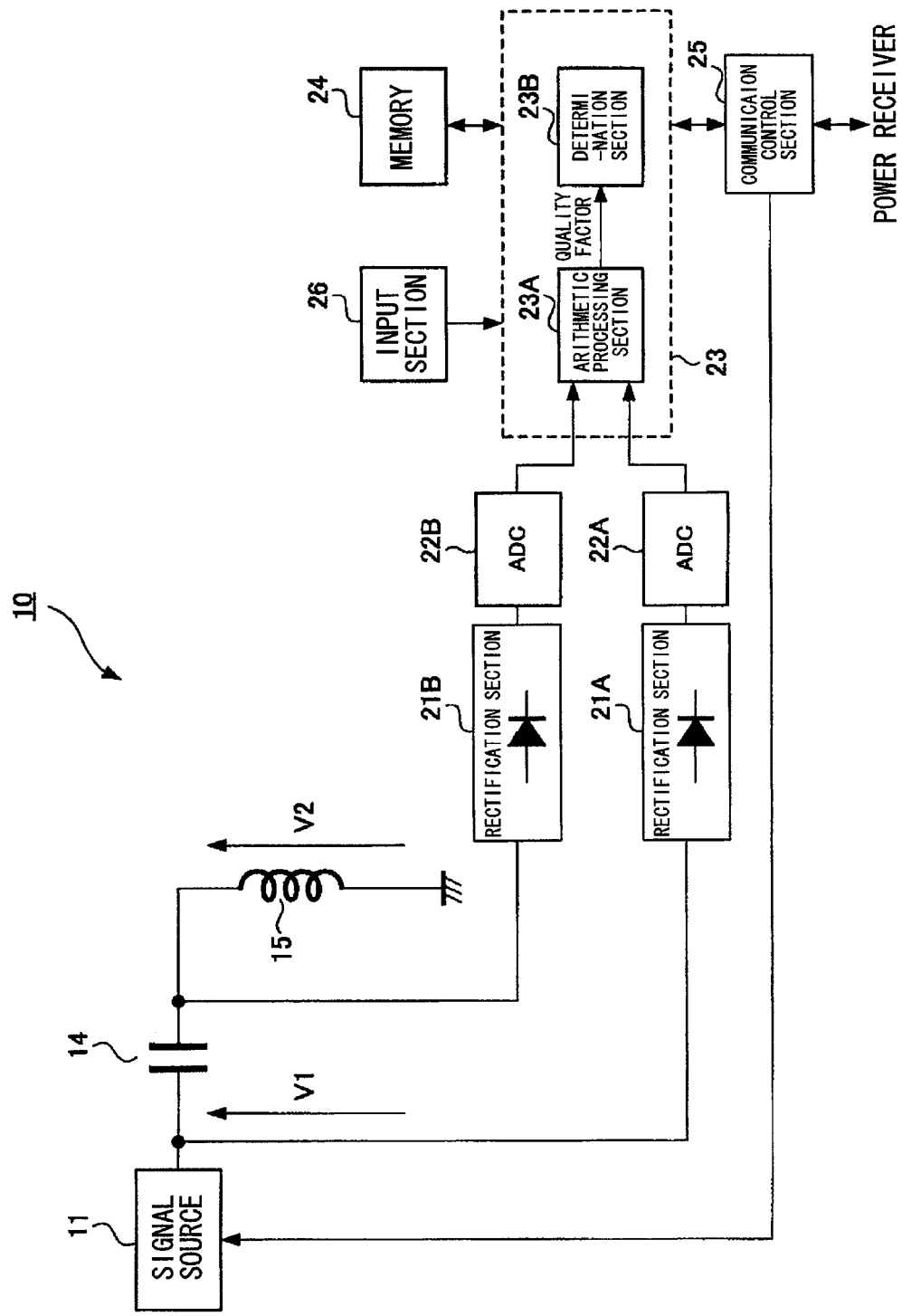
FIG. 5 is a block diagram illustrating an internal configuration example of the power transmitter (on a primary side) according to the first embodiment of the disclosure.

FIG. 5 is a block diagram illustrating an internal configuration example of the power transmitter according to the first embodiment of the disclosure. With use of a detection circuit illustrated in the block diagram, a conductor such as a metal (a foreign metal) is detected. The power transmitter provided with the detection circuit is an example of an electromagnetic-coupling state detection device.

The detection circuit in the embodiment includes rectification sections 21A and 21B, analog/digital converters (hereinafter, referred to as "ADC") 22A and 22B, and a main control section 23.

The rectification section 21A converts an AC signal (an AC voltage) which is input from between the signal source 11 and the capacitor 14 into a DC signal (DC voltage), and then outputs the converted signal. Likewise, the rectification section 21B converts an AC signal (an AC voltage) which is input from between the primary-side coil 15 and the capacitor 14 into a DC signal (a DC voltage), and then outputs the converted signal. Each of the converted DC signals is output to the ADC 22A and 22B.

The ADCs 22A and 22B convert an analog DC signal input from the rectification sections 21A and 21B into a digital DC signal, respectively, and then output the digital DC signal to the main control section 23.

The main control section 23 is an example of a control section, is configured by, for example, a Micro-Processing Unit (MPU), and controls the entire power transmitter 10. The main control section 23 has functions as an arithmetic processing section 23A and a determination section 23B.

The arithmetic processing section 23A is a block performing predetermined arithmetic processes. In this embodiment, the arithmetic processing section 23A calculates a ratio of the voltage V2 to the voltage V1 from the DC signals input from the ADCs 22A and 22B, that is, calculates a quality factor, and outputs the calculation result to the determination section 23B. In addition, the arithmetic processing section 23A may acquire information (physical amounts such as a voltage value) related to detection of a foreign metal from the power reception side (the secondary side), and then calculate the secondary-side quality factor based on the information.

The determination section 23B compares the calculation result input from the arithmetic processing section 23A with a threshold stored in a non-volatile memory 24, to determine presence of a foreign metal nearby based on the comparison result. Moreover, the determination section 23B may compare the above-described power-reception side quality factor with the threshold to determine presence of a foreign metal nearby.

The memory 24 holds a threshold (Ref_Q1) of the primary-side quality factor, which is previously measured in a state where nothing is located on or near the secondary-side coil. In addition, the memory 24 holds a threshold (Q_Max) of the secondary-side quality factor which is acquired from the power reception side (the secondary side).

A communication control section 25 is an example of a communication section on the primary side, and performs communication with a communication control section of the power receiver which will be described later. The communication control section 25 performs transmission/reception of information related to detection of a foreign metal, for example, reception of the quality factor and the voltages V1 and V2 of the resonance circuit of the power receiver which includes the secondary-side coil. Moreover, the communication control section 25 instructs the signal source 11 to generate or suspend the AC voltage, in response to control of the main control section 23. As a communication standard in communication with the power receiver, for example, a wireless LAN of IEEE 802.11 standard or Bluetooth (registered trademark) may be used. Note that the configuration in which information is transmitted through the primary-side coil 15 and the secondary-side coil of the power receiver may be employed. In addition, the main control section 23 may directly instruct the signal source 11 without the communication control section 25.

An input section 26 generates an input signal corresponding to user operation, and outputs the input signal to the main control section 23.

Incidentally, in this embodiment, the description is made on the configuration in which the power transmitter 10 includes the detection circuit, which enables detection of a foreign metal based on the primary-side quality factor and detection of a foreign metal based on the secondary-side quality factor. The configuration is not limited thereto, and any other configurations are applicable as long as the power transmitter 10 includes the communication control section 25 and the main control section 23 which performs at least arithmetic processing and determination processing, and has a function to detect a foreign metal based on the quality factor of the power receiver.

(Configuration Example of Power Receiver)

Next, a configuration example of a power receiver (on the secondary side) according to the first embodiment of the disclosure is described.

Figure 6:
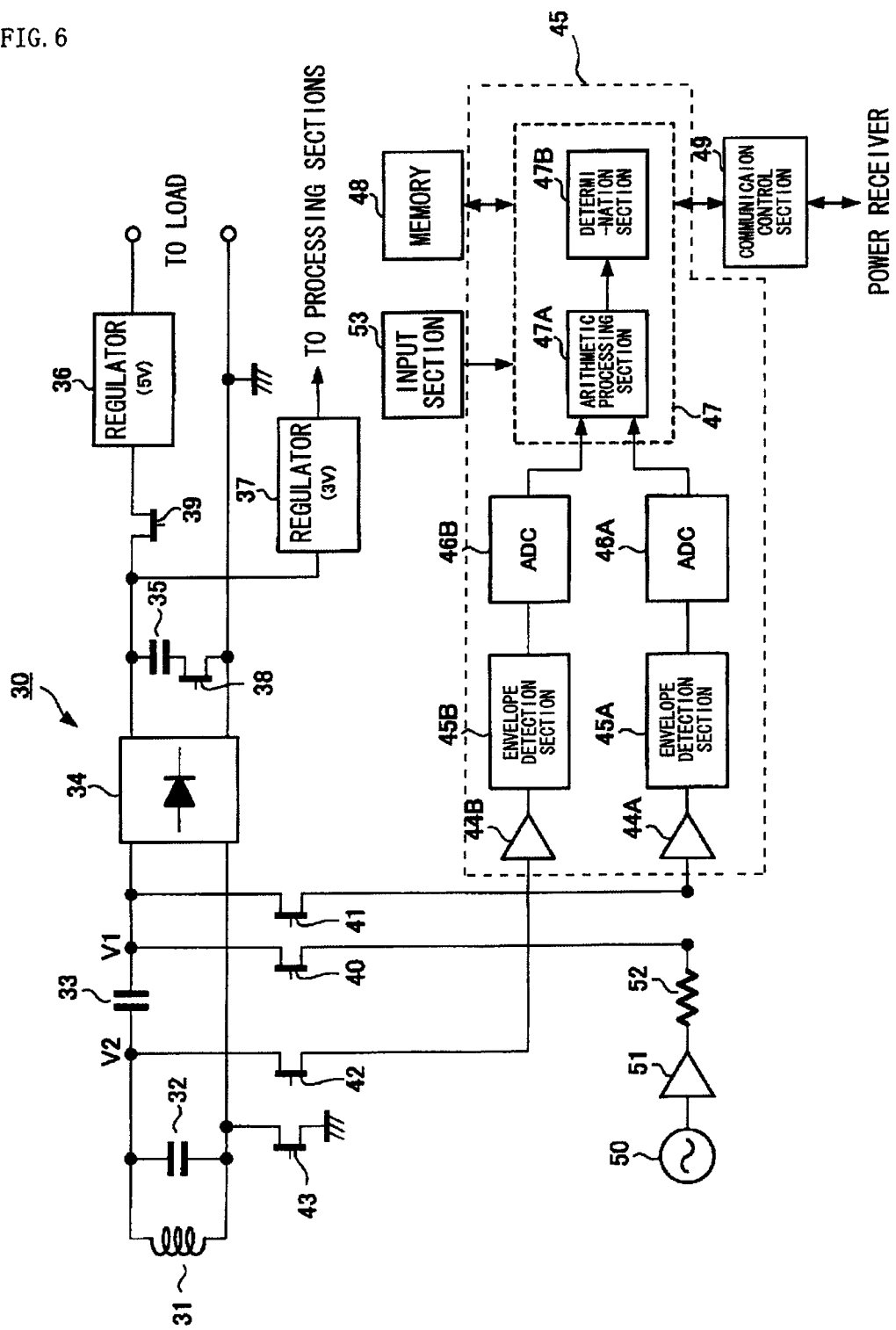
FIG. 6 is a block diagram illustrating an internal configuration example of a power receiver (on a secondary side) according to the first embodiment of the disclosure.

FIG. 6 is a block diagram illustrating an internal configuration example of the power receiver applied to a mobile phone and the like. The detection circuit illustrated in the block diagram detects a foreign metal. The power receiver provided with the detection circuit is an example of an electromagnetic-coupling state detection device. The detection circuit is an example of a detection section.

A power receiver 30 in the embodiment includes a secondary-side coil 31 and a capacitor 32 connected in parallel to the secondary-side coil 31. A first end of each of the coil 31 and the capacitor 32 which are connected in parallel is connected to a first end of a capacitor 33, and a second end of the capacitor 33 is connected to a first input end of a rectification section 34. In addition, a second end of each of the secondary-side coil 31 and the capacitor 32 which are connected in parallel is connected to a second input end of the rectification section 34.

Moreover, a first output end of the rectification section 34 is connected to an input end of a first regulator 36 through a second switch 39. An output end of the first regulator 36 is connected to a load, and a second output end of the rectification section 34 is connected to a ground terminal. The first output end of the rectification section 34 is also connected to a second regulator 37.

Furthermore, a capacitor 35 is connected in series to a first switch 38, one end of the capacitor 35 is connected to the first output end of the rectification section 34, and one end of the first switch 38 is connected to the second output end of the rectification section 34.

The first regulator 36 controls an output voltage and an output current to be maintained constant, and supplies a voltage of 5 V, for example, to the load. Likewise, the second regulator 37 supplies a voltage of 3 V, for example, to respective blocks including the corresponding switch.

The second end of the capacitor 33 is connected to a third switch 40, and is connected to an AC power source 50 (an oscillation circuit) through the third switch 40, a resistance element 52, and an amplifier 51. In addition, the second end of the capacitor 33 is connected to an input end of an amplifier 44A through a third switch 41. On the other hand, the first end of the capacitor 33 is connected to an input end of an amplifier 44B through a third switch 42. In addition, the second end of each of the secondary-side coil 31 and the capacitor 32 which are connected in parallel is connected to a ground terminal through a third switch 43.

As the first switch 38 (an example of a first switch section), the second switch 39 (an example of a second switch section), and the third switches 40 to 43 (an example of a third switch section), a switching element such as metal-oxide semiconductor field-effect transistor (MOSFET) is applied.

An output end of the amplifier 44A is connected, within a detection circuit 45, to an envelope detection section 45A. The envelope detection section 45A detects an envelope of the AC signal (corresponding to the voltage V1) which is input from the second end of the capacitor 33 through the third switch 41 and the amplifier 44A, and supplies the detected signal to an analog/digital converter (ADC) 46A.

On the other hand, an output end of the amplifier 44B is connected, within the detection circuit 45, to an envelope detection section 45B. The envelope detection section 45B detects an envelope of the AC signal (corresponding to the voltage V2) which is input from the first end of the capacitor 33 through the third switch 42 and the amplifier 44B, and supplies the detected signal to an analog/digital converter (ADC) 46B.

The ADCs 46A and 46B convert an analog detected signal input from the envelope detection sections 45A and 45B into a digital detected signal, respectively, and then output the digital detected signal to a main control section 47.

The main control section 47 is an example of a control section, is configured by, for example, a Micro-Processing Unit (MPU), and controls the entire power receiver 30. The main control section 47 has functions as an arithmetic processing section 47A and a determination section 47B. The main control section 47 supplies a drive signal to each switch (a gate terminal of an MOSFET) with use of the power supplied from the second regulator 37, and performs ON/OFF control (switching function).

The arithmetic processing section 47A is a block performing predetermined arithmetic processes. The arithmetic processing section 47A calculates a ratio of the voltage V2 to the voltage V1 from the detected signal input from the ADCs 46A and 46B, that is, calculates the quality factor, and outputs the calculation result to the determination section 47B. In addition, the arithmetic processing section 47A may transmit information (a voltage value and the like) of the input detected signal to the power transmission side (the primary side), according to setting. Moreover, the arithmetic processing section 47A performs frequency sweep processing during detection processing of a foreign metal (sweep processing function).

The determination section 47B compares the quality factor input from the arithmetic processing section 47A with a threshold stored in a non-volatile memory 48, to determine presence of a foreign metal nearby based on the comparison result. As will be described later, the measurement information may be transmitted to the power transmitter 10, and the power transmitter 10 may calculate the secondary-side quality factor and determine presence of a foreign metal.

The memory 48 holds a threshold to be compared with the quality factor. The threshold is previously measured in a state where nothing is located on or near the secondary-side coil 31.

The amplifiers 44A and 44B, the envelope detection sections 45A and 45B, the ADCs 46A and 46B, the main control section 47 (the arithmetic processing section 47A and the determination section 47B), and/or the memory 48, which are subsequent to the amplifiers 44A and 44B, are examples of components configuring the detection circuit 45.

A communication control section 49 is an example of a communication section on the secondary side, and performs communication with the communication control section 25 of the power transmitter 10. The communication control section 49 performs transmission/reception of information related to detection of a foreign metal, for example, transmission of the quality factor and the voltages V1 and V2 of the resonance circuit of the power receiver 30 which includes the secondary-side coil 31. The communication standard applied to the communication control section 49 is similar to that applied to the communication control section 25 of the power transmitter 10. Note that the configuration in which the information is transmitted through the secondary-side coil 31 and the primary-side coil 15 of the power transmitter 10 may be available.

The AC power source 50 generates an AC voltage (a sine wave) during quality factor measurement based on the control signal of the main control section 47, and supplies the AC voltage to the second end of the capacitor 33 through the amplifier 51 and the resistance element 52.

An input section 53 generates an input signal corresponding to user operation, and outputs the input signal to the main control section 47.

[Operation of Power Receiver]

The detection circuit of the power receiver 30 configured as described above is controlled by ON/OFF switching of three switch groups, that is, the first switch 38, the second switch 39, and the third switches 40 to 43. Hereinafter, the operation of the power receiver 30 is described with paying attention to switching of respective switches.

First, the power received from the power transmitter 10 through the secondary-side coil 31 is charged in the capacitor 35 (an example of a power storage section) provided subsequently to the rectification section 34. A current value and a time operable by the power charged in the capacitor are determined by an expression (6).

[Numerical Expression 6]

$$CV = it \qquad (6)$$

In the expression (6), C is a capacitance value of the capacitor, V is a voltage value of the capacitor, i is a current value of the capacitor, and t is a time. Specifically, when the voltage value charged in the capacitor of 10 μF is changed from 9 V to 4 V, for example, the current of 50 mA is allowed to flow for 1 msec. If the capacitance value of the capacitor is large, it is possible to flow a large current or to extend a time of current flow.

Incidentally, if the capacitor 35 with a high capacitance value is provided subsequently to the rectification section 34, defect may occur during communication between the power receiver 30 and external devices. Therefore, control by the switch 38 is desirable. In other words, conduction between the drain and the source of the first switch 38 is made and the capacitor 35 is connected only during the quality factor measurement so that the adverse affect is eliminated.

Figure 7:
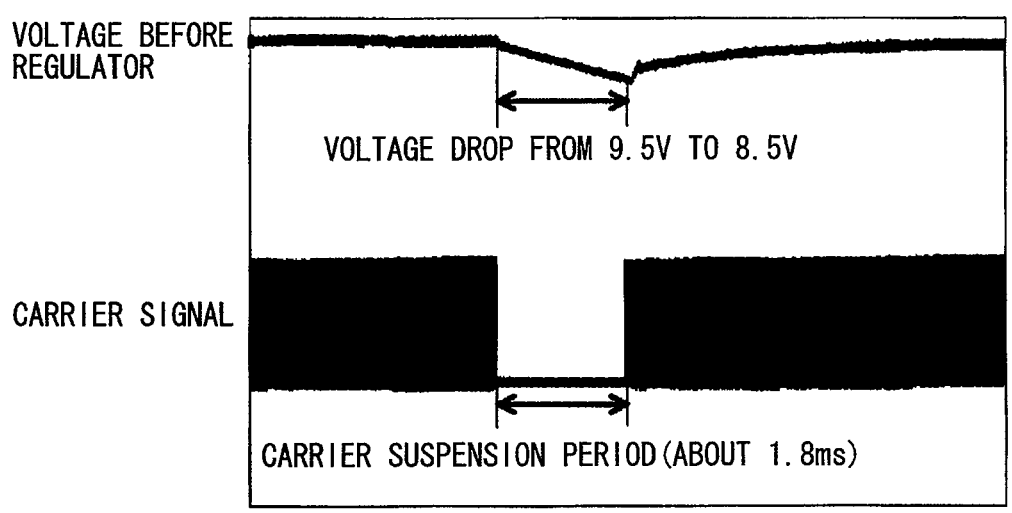
FIG. 7 is a waveform diagram illustrating a state of a voltage drop at an input end of a first regulator by a capacitor charging.

FIG. 7 illustrates a diagram of a waveform of a state in which the voltage (the voltage at the input end of the first regulator 36) actually charged in the capacitor 35 drops.

Originally, the voltage at the input end of the first regulator 36 drops to 0 V when a carrier signal of the power transmitter 10 is stopped. In the figure, however, it is confirmed that voltage drop is moderate due to an electric charge accumulated in the capacitor 35. In example of FIG. 7, the voltage at the input end of the first regulator 36 gradually drops from 9.5 V to 8.5 V during carrier suspension period of about 1.8 ms.

Accordingly, if the detection section consumes small current to some extent and a time of quality factor measurement is short, the quality factor is allowed to be measured while the carrier signal output from the power transmitter 10 is suspended. Note that when the carrier signal output from the power transmitter 10 is suspended (during the quality factor measurement), the load needs to be surely electrically separated from the detection section. For example, such electrical separation is controlled by using a P-channel MOSFET as the second switch 39, and using control in which the power receiver 30 is turned off in response to the input of the carrier signal or using an enable function of the first regulator 36. Disconnection of the load from the detection circuit is not necessary during the charge of the capacitor 35 or communication through the communication control section 49.

At the time of the quality factor measurement, the voltage value between both ends of the capacitor 33 is measured by using a similar method to the above-described measuring instruments (LCR meter). Specifically, the third switches 40 to 43 are turned on at the timing of suspension of the carrier signal, and the quality factor is calculated from two voltage waveforms which are obtained by rectifying the sine wave output from the AC power source 50 and are detected on the first and second ends of the capacitor 33. Detection of a foreign metal is performed by comparing the calculated quality factor with the predetermined threshold.

[Overall Control of Non-Contact Power Transmission System]

Next, overall control of a non-contact power transmission system according to the first embodiment of the disclosure will be described.

Figure 8:
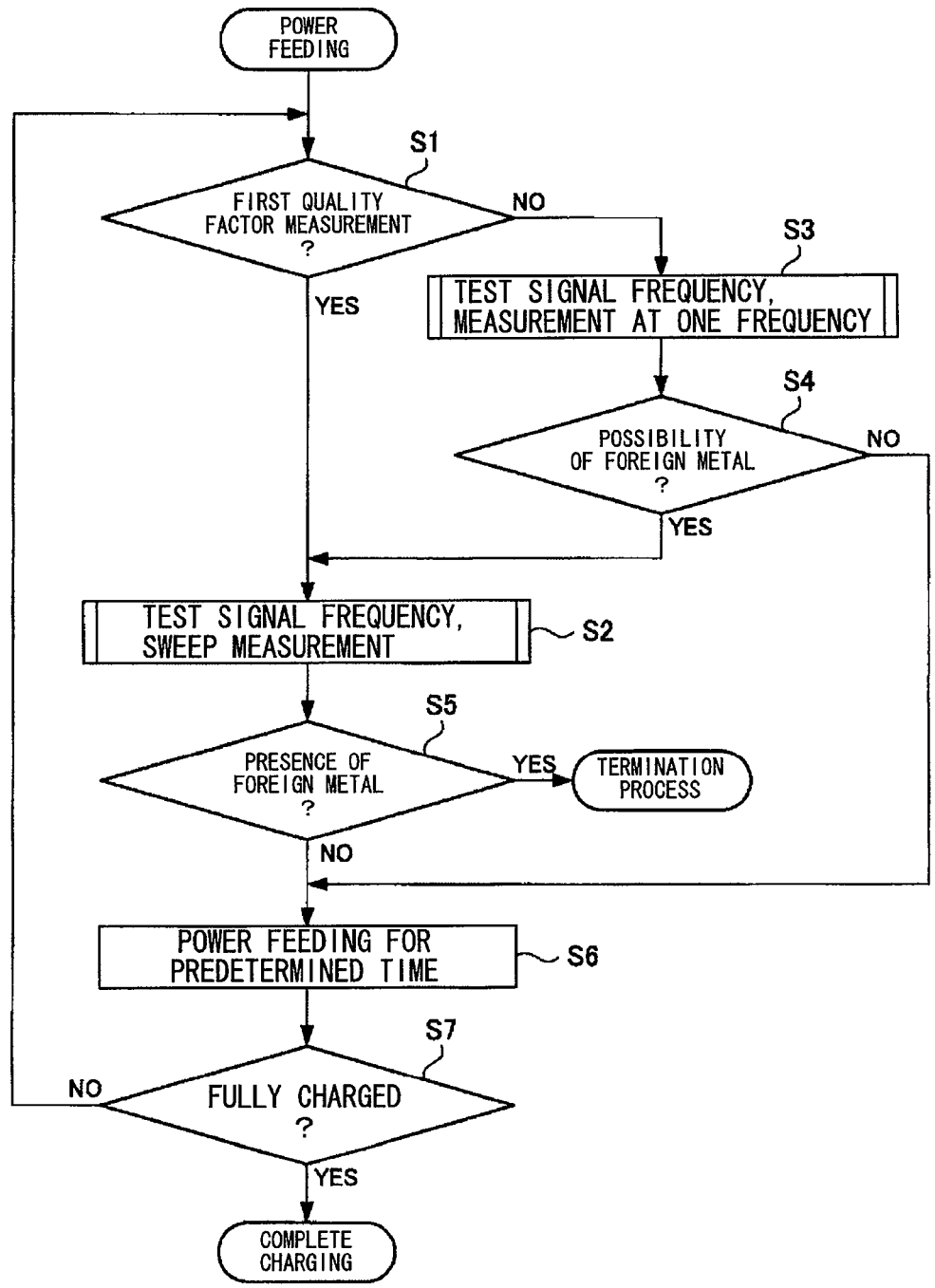
FIG. 8 is a flowchart illustrating processes during power feeding of the non-contact power transmission system according to the first embodiment of the disclosure.

FIG. 8 is a flowchart illustrating processing during power feeding of the non-contact power transmission system which is configured to include the power transmitter 10 (see FIG. 5) and the power receiver 30 (see FIG. 6).

When the power transmitter 10 (on the primary side) is activated and the power receiver 30 (on the secondary side) is disposed near the power transmitter 10, negotiation is performed between the power transmitter 10 and the power receiver 30. Power feeding is started after the power transmitter 10 and the power receiver 30 recognizes the other side with each other. The power transmitter 10 or the power receiver 30 performs the quality factor measurement at the time of starting power feeding, and determines whether the current quality factor measurement is a first time measurement (step S1).

For example, if the measurement is performed immediately after the power transmitter 10 or the power receiver 30 is turned on, the respective devices determine that the current quality factor measurement is the first time measurement. Alternatively, as a result of the negotiation, when the power receiver 30 is identified as a first communication partner from ID information (identification information) of the power receiver 30, the power transmitter 10 determines that the current quality factor measurement is a first time measurement. Still alternatively, at the time of the negotiation, the power transmitter 10 may receive, from the power receiver 30, the result of the number of times of the quality factor measurement which is calculated by the power receiver 30, and perceives the number of times of the quality factor measurement.

As still another example, the determination may be made by using a time elapsed from the previous quality factor measurement. The power transmitter 10 (and the power receiver 30) has a clock section (not illustrated), and when performing the quality factor measurement, the power transmitter 10 (and the power receiver 30) stores, in the memory 24 (and the memory 48), the measured quality factor which is corresponded to the measurement time. Then, the power transmitter 10 (and the power receiver 30) compares the time of the previous quality factor measurement with the time of the current quality factor measurement, and when the time difference exceeding a predetermined value is detected, the current quality factor measurement is determined as the first time measurement. For example, quality factor measurement with frequency sweep is defined as the first time measurement, and the number of times of the quality factor measurement is determined with reference to the defined first measurement. Note that a timer function of the clock section may be activated at the time of the previous quality factor measurement, and the number of times of the quality factor measurement may be determined based on the elapsed time of the timer.

When the quality factor measurement is determined as the first measurement, the power receiver 30 uses the plurality of frequencies for the measurement test signals (sine wave) output from the AC power source 50 (sweep measurement), and acquires the largest quality factor from the plurality of obtained secondary-side quality factors (step S2). The frequency of the test signal at the largest quality factor is stored in the memory. The detail of the process in the step S2 will be described later.

To measure the quality factor, a sine wave of the resonance frequency needs to be input to the power receiver 30. However, the resonance frequency is changed due to variation of quality of components in the power receiver 30, variation of a positional relationship between the mounted coil and a metal inside of the device (for example, a housing), environment around the secondary-side coil 31, the contained foreign metal, and the like. Therefore, in consideration of the shift of the resonance frequency, the resonance frequency needs to be found by performing measurement (frequency sweep) with use of a plurality of different frequencies within an appropriate range (measurement range). Although the frequency sweep is necessary for the first quality factor measurement, may be omitted for second and subsequent quality factor measurement, in consideration of the entire non-contact power transmission system. As an example where the frequency sweep is omitted in the second and subsequent quality factor measurement, the case where the positional relationship between the power transmitter 10 and the power receiver 30 is not largely changed from that of the first quality factor measurement is exemplified.

On the other hand, in the case where the current quality factor measurement is not determined as the first measurement in the determination process at the step S1, the power receiver 30 acquires the quality factor with use of a test signal of a frequency determined in the first quality factor measurement (step S3). The detail of the process in the step S3 will be described later.

The power transmitter 10 or the power receiver 30 determines whether there is a possibility that a foreign metal is present, based on the secondary-side quality factor (step S4). When there is no possibility that a foreign metal is present, the process proceeds to a step S6.

On the other hand, when there is a possibility that a foreign metal is present in the determination process in the step S4, the process proceeds to the step S2, and the power receiver 30 performs frequency sweep of the test signal to acquire the largest quality factor from the plurality of secondary-side quality factors.

After the process in the step S2 is finished, the power transmitter 10 or the power receiver 30 determine the presence of a foreign metal based on the secondary-side quality factor obtained by calculation (step S5). When a foreign metal is present, the power feeding is forcibly terminated or an alert is given to a user, as a finishing process. The power feeding is forcibly terminated by stopping power transmission of the power transmitter 10, or stopping power reception of the power receiver 30 even if the power transmitter continues the power transmission.

The quality factor measurement in the above-described steps S2 to S5 is performed with use of the power charged in the power storage section (the capacitor 35). For example, in the case of frequency sweep, after the electric charges are charged in the capacitor 35 by an amount of enabling quality factor (namely, voltages V1 and V2) measurement for a test signal of one frequency, the quality factor measurement, charging, and the quality factor measurement for the test signal of the subsequent frequency are repeated.

Then, when a foreign metal is not detected in the step S5, power feeding from the power transmitter 10 to the power receiver 30 is performed for a predetermined time (step S6).

Finally, the power receiver 30 determines whether the battery or the like (load, not illustrated) has been fully charged, and transmits the determination result to the power transmitter 10 (step S7). When the battery has been fully charged, the charging process is terminated, and when the battery has not been fully charged, the process returns to the step S1 and repeats the above-described processes. Note that the determination and the communication about the full charge may be performed during power feeding.

As described above, the frequency sweep is performed only in the first quality factor measurement, and the quality factor in the second and subsequent measurement is measured only for a test signal of a frequency which is determined as optimum in the first quality factor measurement. However, in the case where it is determined in the second and subsequent quality factor measurement that there is a possibility that a foreign metal is present, the frequency is swept again and determination is performed because there is a possibility of frequency shift due to the change of the positional relationship between the primary-side coil and the secondary-side coil. When the presence of a foreign metal is determined even if the frequency is swept, the power feeding is forcibly terminated or an alert is given to a user. This method significantly decreases the time of the quality factor measurement.

[Example of Performing Quality Factor Measurement with Frequency Sweep on Primary Side]

Next, processing in a case where the quality factor measurement with a frequency sweep in the step S2 is performed on the primary side is described. Since the frequency sweep is performed, it is assumed that the quality factor measurement is determined as the first time measurement. The processing is considered to be performed in the case where the power transmitter 10 determines that the current quality factor measurement is the first time measurement or in the case where the power receiver 30 determines the current quality factor measurement is the first time measurement and transmits the result to the power transmitter 10.

Figure 9:
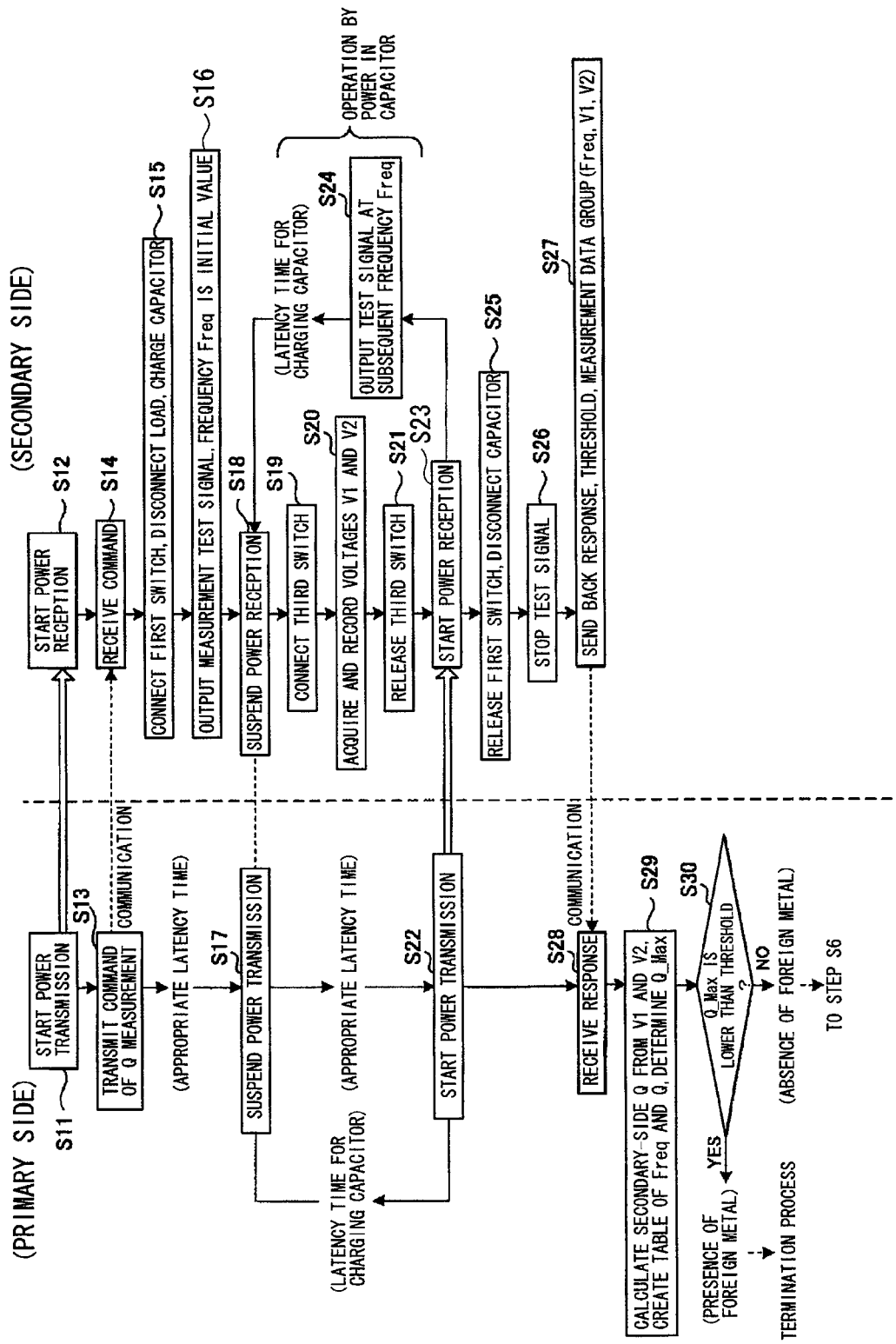
FIG. 9 is a flowchart illustrating processes in the case where a quality factor reflecting frequency sweep is calculated on the primary side (the power transmitter).

FIG. 9 is a flowchart illustrating processing in the case where quality factor measurement reflecting a frequency sweep is performed on the primary side (the power transmitter 10).

First, after completing the negotiation with the main control section 47 of the power receiver 30, the main control section 23 of the power transmitter 10 outputs electromagnetic waves from the primary-side coil 15 to start power transmission (transmission of a carrier signal) to the power receiver 30 (step S11). The main control section 47 of the power receiver 30 receives the electromagnetic waves output from the power transmitter 10 through the secondary-side coil 31 to start power reception (step S12).

Upon starting the power transmission, the main control section 23 of the power transmitter 10 transmits a command of first quality factor measurement to the power receiver 30 through the communication control section 25 (step S13). The main control section 47 of the power receiver 30 receives the command of first quality factor measurement from the power transmitter 10 through the communication control section 49 (step S14).

Figure 10:
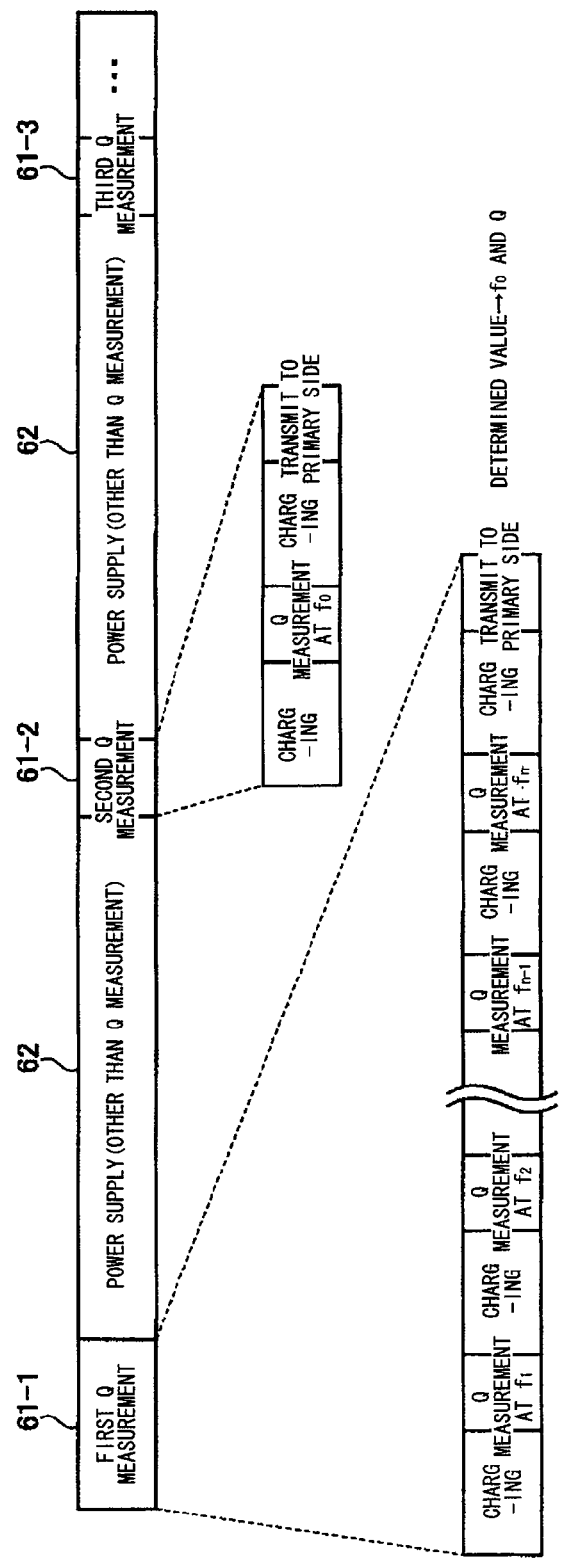
FIG. 10 is a timing chart of operations in the non-contact power transmission system according to the first embodiment of the disclosure.

FIG. 10 is an operation timing chart in the non-contact power transmission system according to the first embodiment of the disclosure.

In the embodiment, a "quality-factor measurement period (61-1, 61-2, and 61-3)" for performing quality factor measurement and a "power supply period (62)" for performing processing such as power supply (other than quality factor measurement) are alternately set. When the communication between the power transmitter 10 and the power receiver 30 is established, the main control section 23 of the power transmitter 10 issues the command of first quality factor measurement in the step S13. The command of first quality factor measurement is transmitted at the head of the first quality-factor measurement period 61-1, for example. The first quality-factor measurement period is divided into a plurality of periods including "charging", "quality factor measurement at frequency $f_1$", "charging", "quality factor measurement at frequency $f_2$", . . . , "quality factor measurement at frequency $f_{n-1}$", "charging", "quality factor measurement at frequency $f_n$", "charging", and "transmission to primary side".

The main control section 47 of the power receiver 30 switches the first switch 38, the second switch 39, and the third switches 40 to 43 between ON and OFF, so as to correspond to the plurality of periods. The main switching timings of the first switch 38, the second switch 39, and the third switches 40 to 43 are described below.

1. The first switch 38 is turned on during a quality-factor measurement period (charge the capacitor 35), and is turned off during the other periods (power supply period).

2. The second switch 39 is turned off during a quality-factor measurement period, and is turned on during the other periods (power supply period).

3. The third switches 40 to 43 are turned on during a quality-factor measurement period (specifically, at the time of detecting the voltages V1 and V2), and are turned off during the other periods.

When receiving the command of first quality factor measurement, the main control section 47 of the power receiver 30 turns the first switch 38 on, electrically connects the rectification section 34 to the capacitor 35, and charges the power received from the primary side. At this time, the main control section 47 of the power receiver 30 turns the second switch 39 off, and disconnects the first regulator 36, that is, the load from the capacitor 35 (step S15).

Subsequently, the AC power source 50 of the power receiver 30 outputs a test signal (a sine wave) for measurement in response to control of the main control section 47. The frequency Freq of the test signal at this time is set to an initial value $f_1$ (step S16).

The main control section 23 of the power transmitter 10 suspends power transmission (transmission of the carrier signal) to the power receiver 30 (step S17). The latency time after the power transmission start in the step S13 until the power transmission suspension in the step S17 is equal to or longer than at least a time necessary for charging the capacitor 35 with desired power (the power necessary for quality factor measurement at one frequency).

The main control section 47 of the power receiver 30 suspends the power reception in response to the suspension of the power transmission from the power transmitter 10 (step S18).

At this time, the main control section 47 turns the third switches 40 to 43 on (step S19). Upon turning the third switch 40 on, the test signal of the frequency $f_1$ generated in the AC power source 50 is supplied to the second end of the capacitor 33 through the third switch 40. In addition, upon turning the third switch 41 on, the second end of the capacitor 33 is conducted with the input end of the amplifier 44A, and upon turning the third switch 42 on, the first end of the capacitor 33 is conducted with the input end of the amplifier 44B.

Then, the main control section 47 detects the voltage V1 at the second end of the capacitor 33 through the amplifier 44A, the envelope detection section 45A, and the ADC 46A, and records the voltage V1 in the memory 48. Likewise, the main control section 47 detects the voltage V2 at the first end of the capacitor 33 through the amplifier 44B, the envelope detection section 45B, and the ADC 46B, and records the voltage V2 in the memory 48 (step S20).

After acquiring the voltages V1 and V2 for the test signal of the frequency $f_1$, the main control section 47 turns the third switches 40 to 43 off (step S21).

At this time, the main control section 23 of the power transmitter 10 restarts the power transmission to the power receiver 30 (step S22). The latency time after the power transmission suspension in the step S17 until the power transmission start in the step S22 is equal to or longer than at least a time necessary for detecting and recording the voltages V1 and V2. Then, after the power transmission to the power receiver 30 is restarted in the step S22, the process returns to the step S17 after the lapse of the latency time of charging the capacitor 35, and the main control section 23 of the power transmitter 10 suspends the power transmission again. The latency time after the power transmission start in the step S22 until the power transmission suspension in the step S17 is equal to or longer than at least a time necessary for charging the capacitor 35 with desired power.

The main control section 47 of the power receiver 30 starts the power reception from the power transmitter 10 in response to restart of the power transmission of the power transmitter 10, and charges the capacitor 35 (step S23). During the latency time for charging the capacitor 35, the AC power source 50 of the power receiver 30 outputs a test signal of a subsequent frequency Freq in response to the control of the main control section 47 (step S24). The frequency Freq of the test signal at this time is $f_2$.

After the process in the step S24 is completed, the process returns to the step S18 after the lapse of the latency time for charging the capacitor 35, and the main control section 47 of the power receiver 30 suspends the power reception in response to suspension of the power transmission from the power transmitter 10. Then, the main control section 47 of the power receiver 30 continues the processes subsequent to the step S19, performs the quality factor measurement with use of the test signal of the frequency $f_2$, and acquires the voltages V1 and V2.

During the period after the power reception suspension in the step S18 until the power reception start in the step S23 (steps S19 to S21), each block in the detection circuit is operated only by the power charged in the capacitor 35.

After the process (frequency sweep) of acquiring the voltages V1 and V2 for each test signal of the respective frequencies is completed, the main control section 47 of the power receiver 30 turns the first switch 38 off, and disconnects the capacitor 35 from the detection circuit (step S25). Subsequently, the main control section 47 of the power receiver 30 controls the AC power source 50 to stop the output of the test signal (step S26).

Then, the main control section 47 of the power receiver 30 responds to the command of first quality factor measurement from the power transmitter 10. As a response, the main control section 47 of the power receiver 30 sends back the threshold used for determination of a foreign metal and the measurement data group (Freq, V1, and V2) obtained with use of the test signals of the respective frequencies, which are stored in the memory 48, to the power transmitter 10 through the communication control section 49 (step S27).

Figure 12:
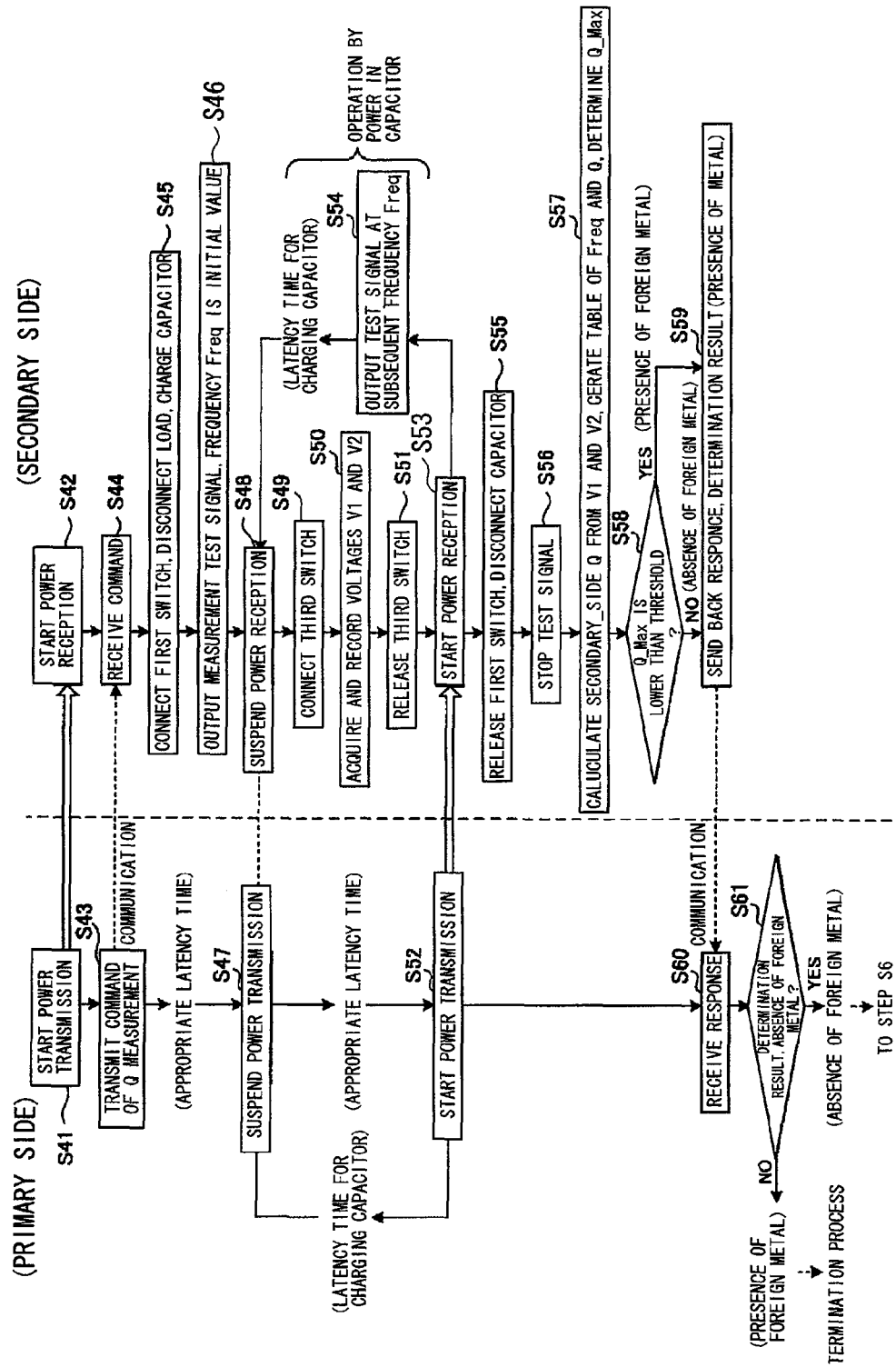
FIG. 12 is a flowchart illustrating processes in the case where a quality factor reflecting frequency sweep is calculated on the secondary side (the power receiver).
Figure 13:
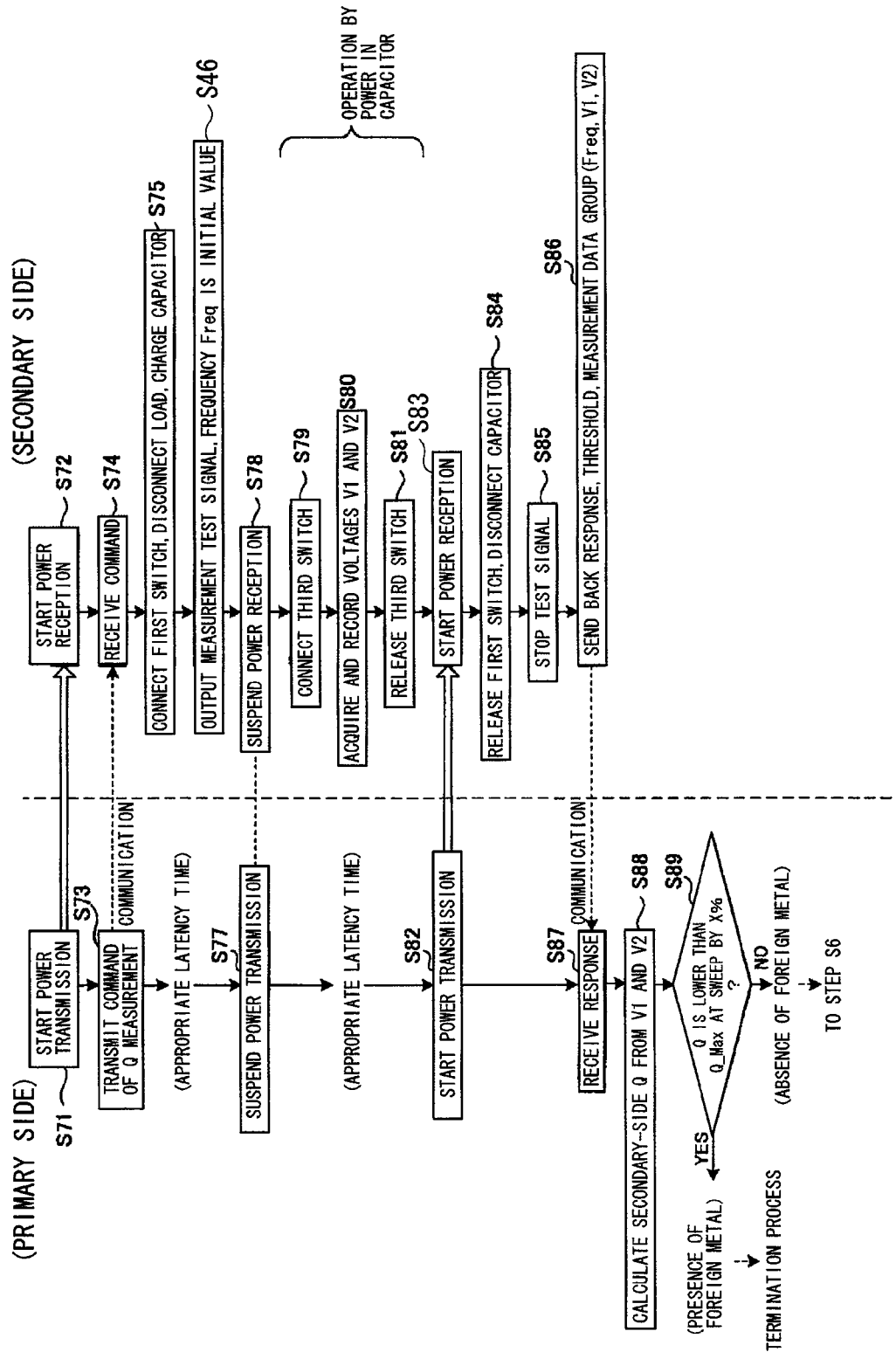
FIG. 13 is a flowchart illustrating processes in the case where a quality factor is calculated on the primary side (the power transmitter).
Figure 14:
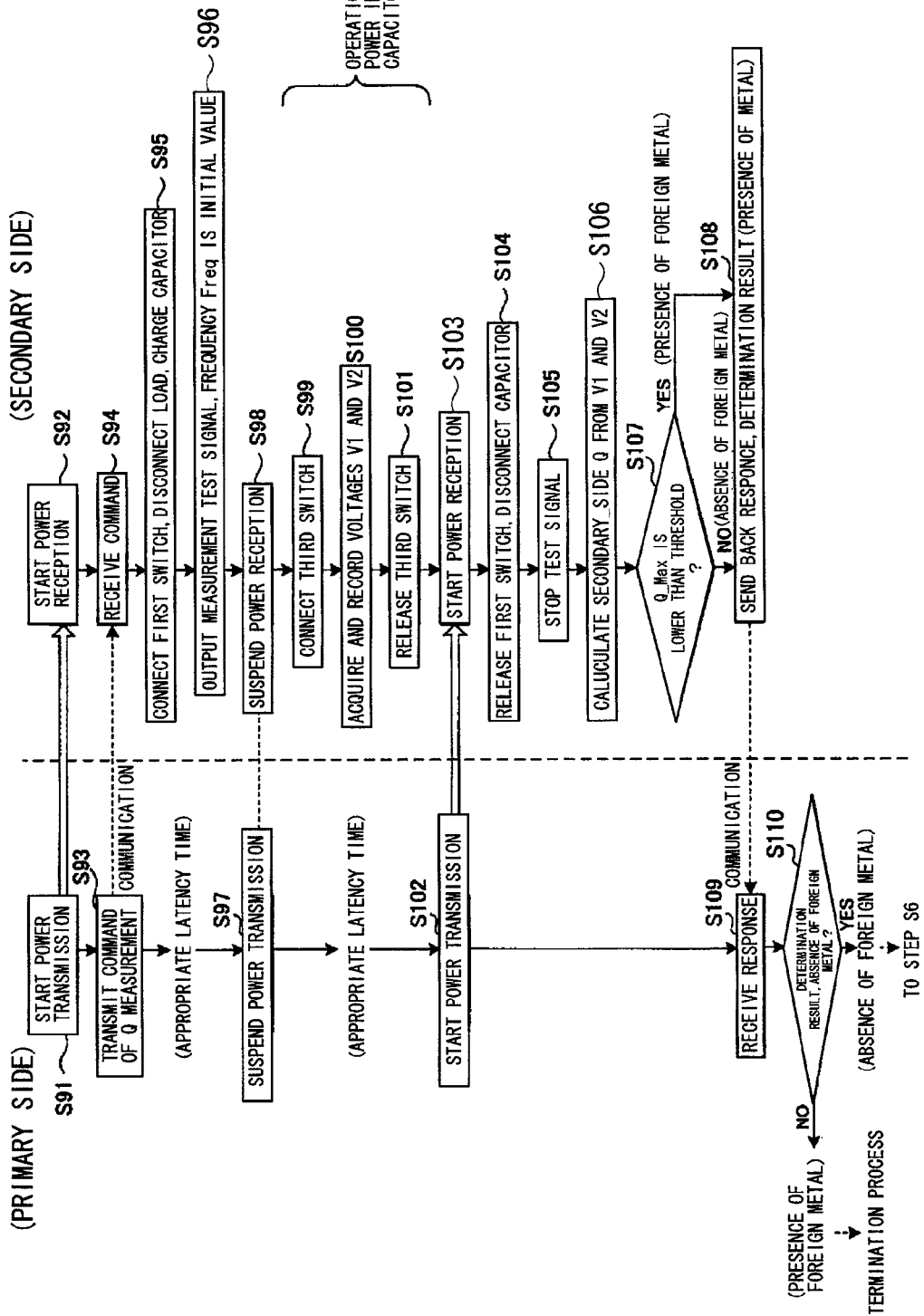
FIG. 14 is a flowchart illustrating processes in the case where a quality factor is calculated on the secondary side (the power receiver).

Incidentally, in the flowchart illustrated in FIG. 9, the second switch 39 is turned off and the first regulator 36 (load) is disconnected from the capacitor 35 (see step S15) while the capacitor 35 is charged. However, the load may be fed with the power while the capacitor 35 is charged. The power feeding (charge to the capacitor 35) needs to be suspended at least during the quality factor measurement (specifically, at the time of detecting the voltages V1 and V2), and the power feeding may be continued or suspended during communication or while the capacitor 35 is charged. The same applies to the other flowchart which will be described below (FIG. 12, FIG. 13, and FIG. 14).

After process in the step S27, the power transmitter 10 receives the threshold and the measurement data group (Freq, V1, and V2) from the power receiver 30, and stores the threshold and the measurement data group in the memory 24 (step S28).

Figure 11:
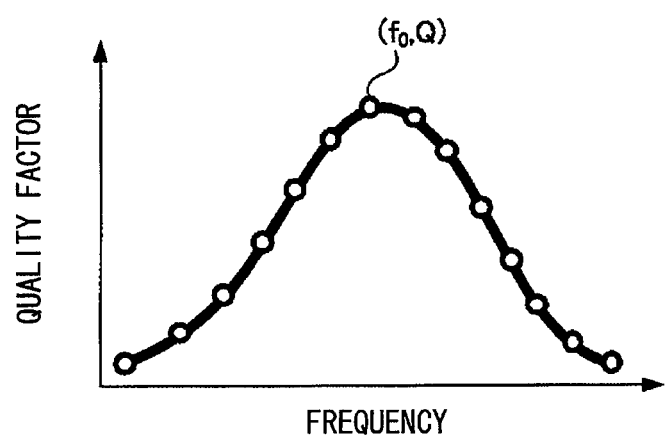
FIG. 11 is a graph plotting a plurality of frequencies and quality factors.

Then, the arithmetic processing section 23A of the power transmitter 10 calculates the secondary-side quality factor from the voltages V1 and V2 for each frequency Freq of the test signals received from the power receiver 30, based on the expression (5), creates a table of the frequencies and the quality factors, and stores the table in the memory 24. FIG. 11 graphically illustrates the relationship between the frequencies of the test signals and the quality factors. The largest secondary-side quality factor (Q_Max) is determined (step S29). In the example of FIG. 11, Q_Max is a quality factor at the frequency $f_0$ near the maximum value in the frequency characteristic curve of the quality factor.

Next, the determination section 23B of the power transmitter 10 compares Q_Max with the threshold stored in the memory 24 to determine whether Q_Max is lower than the threshold (step S30).

When Q_Max is lower than the threshold in the determination process in the step S30, the determination section 23B determines that a foreign metal is present (the step S5 in FIG. 8), and performs completion processing. On the other hand, when Q_Max is not lower than the threshold, the determination section 23B determines that a foreign metal is absent (the step S5 in FIG. 8), and the process proceeds to the step S6.

In the measurement results illustrated in Table 2, the quality factor has a difference by at least 25% between with a foreign metal and without a foreign metal. Therefore, the value obtained by subtracting 25% from the quality factor with a foreign metal may be used as the threshold, for example. The value is merely an example, and the value is desirably set appropriately according to the measurement target because the change amount of the quality factor is different depending on the structure of the power receiver, environment, the size and kind of a foreign metal to be detected.

[Example of Calculating Quality Factor Reflecting Frequency Sweep on Secondary Side]

Next, processing in the case where the quality factor reflecting a frequency sweep in the step S2 is calculated on the secondary side is described. Since the frequency sweep is performed, it is assumed that the quality factor measurement is determined as the first time measurement, similarly to the flowchart in FIG. 9.

FIG. 12 is a flowchart illustrating processing in the case where quality factor measurement reflecting a frequency sweep is performed on the secondary side (the power receiver 30).

The processes in steps S41 to 56 in FIG. 12 are the same as those in the steps S11 to S26 in FIG. 9, and thus the description thereof is omitted.

After output of the test signal is stopped in the step S56, the arithmetic processing section 47A of the power receiver 30 calculates the secondary-side quality factor from the voltages V1 and V2 for each frequency Freq of the test signals, based on the expression (5), creates a table of the frequencies and the quality factors, and stores the table in the memory 48. Then, the arithmetic processing section 47A of the power receiver 30 determines the largest secondary-side quality factor (Q_Max) (step S57).

Next, the determination section 47B of the power receiver 30 compares Q_Max with the threshold stored in the memory 48 to determine whether Q_Max is lower than the threshold (step S58).

In the determination process in the step S58, when Q_Max is lower than the threshold, the determination section 47B determines a foreign metal is present. On the other hand, when Q_Max is not lower than the threshold, the determination section 47B determines a foreign metal is absent.

Then, the main control section 47 of the power receiver 30 responds to the command of first quality factor measurement from the power receiver 10. As a response, the main control section 47 of the power receiver 30 sends back the determination result of a foreign metal to the power transmitter 10 through the communication control section 49 (step S59).

The power transmitter 10 receives the determination result of a foreign metal from the power receiver 30 (step S60).

Then, the determination section 23B of the power transmitter 10 uses the determination result of a foreign metal received from the power receiver 30 to determine the presence of a foreign metal (step S61).

In the determination process in the step S61, the determination section 23B performs a completion process when the received determination result indicates the presence of a foreign metal (step S5 in FIG. 8). On the other hand, when the determination result indicates the absence of a foreign metal (step S5 in FIG. 8), the process proceeds to the step S6.

As described above, both in the case where the quality factor is calculated in the power transmitter 10 (on the primary side) and in the case where the quality factor is calculated in the power receiver 30 (on the secondary side), the threshold to be compared with the calculated quality factor is held by the power receiver 30. When the calculation is performed in the power transmitter 10, the threshold is transmitted together with the voltage value because various devices are used as the power receiver 30 and the threshold is expected to be varied depending on the device.

As illustrated in FIG. 9, when the power transmitter 10 (on the primary side) performs calculation of the quality factor and determination of a foreign metal, it is advantageous that the power receiver 30 (on the secondary side) needs not have hardware for an arithmetic processing section and a determination section. For example, a mobile device used as the power receiver 30 is expected to be reduced in size, weight, and cost.

On the other hand, as illustrated in FIG. 12, when the power receiver 30 (on the secondary side) performs calculation of the quality factor and determination of a foreign metal, the power receiver 30 (on the secondary side) needs to have hardware for an arithmetic processing section and a determination section. Incidentally, only information of the determination result indicating the presence or absence of a foreign metal is transmitted to the power transmitter 10 (on the primary side). Accordingly, the information amount is small and thus communication time is expected to be reduced.

[Example of Performing Second and Subsequent Quality Factor Measurement on Primary Side]

Next, processing in the case where second and subsequent quality factor measurement is performed on the primary side is described. In this example, although the case where second quality factor measurement after a frequency sweep is performed is described, the same applies to a third and subsequent quality factor measurement.

FIG. 13 is a flowchart illustrating processing in the case where quality factor measurement is preformed on the primary side (the power transmitter).

Processes in steps S71 to S85 in FIG. 13 correspond to processes in the steps S11 to S26 (without step S24) in FIG. 9, and thus different points between FIG. 9 and FIG. 13 will be described mainly.

When the power transmission is started in the steps S71 and S72, the main control section 23 of the power transmitter 10 transmits a command of second quality factor measurement to the power receiver 30 through the communication control section 25 (step S73). The main control section 47 of the power receiver 30 receives the command of second quality factor measurement from the power transmitter 10 through the communication control section 49 (step S74).

The command of second quality factor measurement is transmitted at the head of a second quality-factor measurement period 61-2 (see FIG. 10), for example. The second quality-factor measurement period 61-2 is divided into four periods including "charging", "quality factor measurement at frequency $f_0$", "charging", and "transmission to primary side". The main control section 47 of the power receiver 30 switches the first switch 38, the second switch 39, and the third switches 40 to 43 between ON and OFF, so as to correspond to the four periods.

When receiving the command of second quality factor measurement, the main control section 47 of the power receiver 30 turns the first switch 38 on, and connects the capacitor 35 to the detection circuit for charging. At this time, the main control section 47 of the power receiver 30 turns the second switch 39 off, and disconnects the first regulator 36, that is, the load from the capacitor 35 (step S75).

Subsequently, the AC power source 50 of the power receiver 30 outputs a test signal (a sine wave) for measurement in response to control of the main control section 47. The frequency Freq of the test signal at this time is set to the frequency $f_0$ (≈a resonance frequency) at which the largest quality factor (Q_Max) is obtained in the previous frequency sweep processing (step S76).

The main control section 23 of the power transmitter 10 suspends power transmission (transmission of the carrier signal) to the power receiver 30 (step S77). The latency time after the power transmission start in the step S73 until the power transmission suspension in the step S77 is equal to or longer than at least a time necessary for charging the capacitor 35 with desired power (the power necessary for quality factor measurement at one frequency).

The main control section 47 of the power receiver 30 suspends the power reception in response to the suspension of the power transmission from the power transmitter 10 (step S78).

At this time, the main control section 47 turns the third switches 40 to 43 on (step S79). Then, the main control section 47 detects the voltage V1 at the second end of the capacitor 33, and stores the voltage V1 in the memory 48. At the same time, the main control section 47 detects the voltage V2 at the first end of the capacitor 33, and stores the voltage V2 in the memory 48 (step S80). After acquiring the voltages V1 and V2 for the test signal of the frequency $f_0$, the main control section 47 turns the third switches 40 to 43 off (step S81).

At this time, the main control section 23 of the power transmitter 10 restarts the power transmission to the power receiver 30 (step S82). The latency time after the power transmission suspension in the step S77 until the power transmission start in the step S82 is equal to or longer than at least a time necessary for detecting and recording the voltages V1 and V2. In FIG. 9, after the power transmission to the power receiver 30 is restarted, the power transmission is suspended again after the lapse of the latency time of charging the capacitor 35. In this example, however, the power transmission is not suspended again because only acquisition of the measurement data for the test signal of the frequency $f_0$ is necessary.

The main control section 47 of the power receiver 30 starts the power reception from the power transmitter 10 in response to restart of the power transmission of the power transmitter 10, and charges the capacitor 35 (step S83).

In FIG. 9, although a test signal of the subsequent frequency Freq ($f_2$) is output during the latency time for charging the capacitor 35 (see step S24), it is not performed in this example.

After the process of acquiring the voltages V1 and V2 for the test signal of the frequency $f_0$ is completed, the main control section 47 of the power receiver 30 turns the first switch 38 off, and disconnects the capacitor 35 from the detection circuit (step S84). Subsequently, the main control section 47 of the power receiver 30 controls the AC power source 50 to stop the output of the test signal (step S85).

Then, the main control section 47 of the power receiver 30 responds to the command of second quality factor measurement from the power transmitter 10. As a response, the main control section 47 of the power receiver 30 sends back the threshold used for determination of a foreign metal and the measurement data group ($f_0$, V1, and V2) for the test signal of the frequency $f_0$, which are stored in the memory 48, to the power transmitter 10 through the communication control section 49 (step S86).

The power transmitter 10 receives the threshold and the measurement data group ($f_0$, V1, and V2) from the power receiver 30, and stores the threshold and the measurement data group in the memory 24 (step S87).

Then, the arithmetic processing section 23A of the power transmitter 10 calculates the secondary-side quality factor from the voltages V1 and V2 for the test signal of the frequency $f_0$ received from the power receiver 30, based on the expression (5) (step S88).

Subsequently, the determination section 23B of the power transmitter 10 compares the calculated secondary-side quality factor with Q_Max at the frequency sweep stored in the memory 24 to determine whether the quality factor is within a predetermined range of Q_Max. As a specific example, the determination section 23B of the power transmitter 10 determines whether the quality factor is lower than Q_Max by X % (step S89). In other words, Q_Max at the previous frequency sweep is used as a reference quality factor for detecting a foreign metal.

In the determination process in the step S89, when the quality factor is lower than Q_Max by X % or more, the determination section 23B determines that there is a possibility that a foreign metal is present (step S4 in FIG. 8), and the process proceeds to the step S2. On the other hand, when the quality factor is not lower than Q_Max by X %, the determination section 23B determines that a foreign metal is absent (step S4 in FIG. 8), and the process proceeds to the step S6.

In the above-described determination process, when the quality factor is lower than Q_Max by X % or more, it is determined that there is a possibility that a foreign metal is present. This is because, as described above, there is a possibility of frequency shift due to the change of a positional relationship between the primary-side coil and the secondary-side coil. In other words, the frequency in the second quality factor measurement may be shifted from the resonance frequency $f_0$ determined in the first quality factor measurement (frequency sweep). Therefore, there is a possibility that the quality factor (Q_Max) at the resonance frequency $f_0$ obtained in the first quality factor measurement (frequency sweep) is largely different from the quality factor obtained in the second quality factor measurement with use of the resonance frequency $f_0$. Accordingly, when the quality factor obtained in the second quality factor measurement is lower than Q_Max by X % or more, it is determined that there is a possibility of a foreign metal, and process proceeds to the step S2 to perform frequency sweep processing again for secure determination of a foreign metal.

[Example of Performing Second and Subsequent Quality Factor Calculation on Secondary Side]

Next, processing in the case where second and subsequent quality factor measurement is performed on the secondary side is described. In this example, the case where second quality factor measurement after a frequency sweep is described.

FIG. 14 is a flowchart illustrating processing in the case where quality factor calculation is performed on the secondary side (the power receiver).

Processes in steps S91 to S105 in FIG. 14 are the same as those in the steps S71 to S85 in FIG. 13, and thus the description thereof will be omitted.

After the output of the test signal is stopped in the step S105, the arithmetic processing section 47A of the power receiver 30 calculates the secondary-side quality factor from the voltages V1 and V2 for the test signal of the frequency $f_0$, based on the expression (5) (step S106).

Next, the determination section 47B of the power receiver 30 compares the calculated secondary-side quality factor with Q_Max (reference quality factor) at the previous frequency sweep stored in the memory 48 to determine whether the quality factor is lower than Q_Max by X % (step S107).

In the determination process in the step S107, when the quality factor is lower than Q_Max by X % or more, the determination section 47B determines that there is a possibility that a foreign metal is present. On the other hand, when the quality factor is not lower than Q_Max by X %, the determination section 47B determines that a foreign metal is absent.

Then, the main control section 47 of the power receiver 30 responds to the command of second quality factor measurement from the power transmitter 10. As a response, the main control section 47 of the power receiver 30 sends back the determination result of a foreign metal to the power transmitter 10 through the communication control section 49 (step S108).

The power transmitter 10 receives the determination result of a foreign metal from the power receiver 30 (step S109).

Then, the determination section 23B of the power transmitter 10 uses the determination result of a foreign metal received from the power receiver 30 to determine the presence of a foreign metal (step S110).

In the determination process in the step S110, when the received determination result indicates that there is a possibility that a foreign metal is presence (step S4 in FIG. 8), the process of the determination section 23B returns to the step S2. On the other hand, when the received determination result indicates that a foreign metal is absent (step S4 in FIG. 8), the process of the determination section 23B proceeds to the step S6.

As illustrated in FIG. 13 and FIG. 14, the second and subsequent quality factor measurement is preformed with use of the frequency $f_0$ and the quality factor determined in the first quality factor measurement (determination process of a foreign metal) so that a time of quality factor measurement for detecting a foreign metal with respect to the time of power feeding is allowed to be reduced (see FIG. 10).

In the above-described first embodiment, the influence of a metal housing on a secondary-side (mobile phone and the like) is eliminated by using the secondary-side quality factor for detection of a foreign substance. Accordingly, compared with detection of a foreign substance by typical DC-DC efficiency, detection accuracy of a foreign metal is allowed to be improved.

In addition, power is charged in the capacitor and the detection circuit is driven by the power whenever the quality factor is measured so that the quality factor is allowed to be measured without using a secondary-side battery when the power feeding from the primary side to the secondary side is not performed. Therefore, a large battery for detecting a foreign metal or a complicated circuit for controlling its power is not necessary on the secondary side, and thus a mobile device and the like is expected to be reduced in size, weight, and cost.

Moreover, by appropriately switching the third switches 40 to 43 in the power feeding and the quality factor measurement, interference between a measurement signal (a sine wave signal) used in the quality factor measurement, which is output from the AC power source on the secondary side, and a power feeding signal fed from the primary side is prevented, and thus quality factor is calculated with high accuracy.

In the embodiment, although a capacitor is used as a power storage section for storing electric charges to be consumed in the quality factor measurement, a power storage means other than a capacitor, for example, a small secondary battery may be used.

[Examples of Other Resonance Circuit]

Figure 15A:
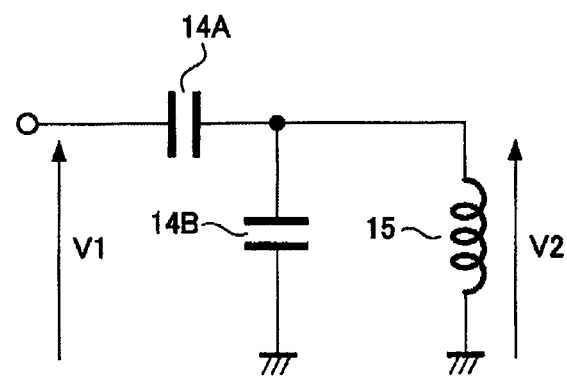
FIGS. 15A and 15B are circuit diagrams illustrating other examples of a resonance circuit used in the non-contact power transmission system.
Figure 15B:
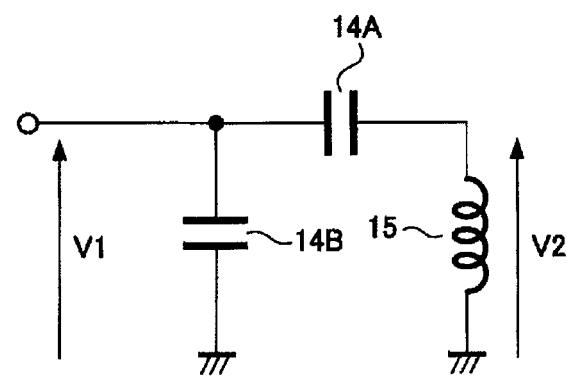

Incidentally, in the embodiment, an example in which the power transmitter 10 includes a serial resonance circuit is described. However, any other resonance circuits may be used as a resonance circuit. Examples thereof are illustrated in FIGS. 15A and 15B. In the example of FIG. 15A, a capacitor 14A is connected in series with a parallel resonance circuit of a capacitor 14B and the primary-side coil 15 to configure a resonance circuit. Moreover, in the example of FIG. 15B, the capacitor 14B is connected in parallel with a serial resonance circuit of the capacitor 14A and the primary-side coil 15 to configure a resonance circuit. A detection section calculates a primary-side quality factor with use of a voltage V1 between the primary-side coil 15 and the capacitor 14A and a voltage V2 between both ends of the primary-side coil 15. Both the voltages V1 and V2 are obtained in the resonance circuit illustrated in FIGS. 15A and 15B. The serial resonance circuit and the other resonance circuits described above are merely examples, and the configuration of the resonance circuit is not limited to the examples. Similarly to the power transmitter 10, various resonance circuits may apply to the power receiver 30. In FIG. 6, the resonance circuit illustrated in FIG. 15A is applied.

2. Second Embodiment

In the first embodiment, the arithmetic processing sections 23A and 47A determine the quality factor from the voltage V1 between the primary-side coil and the capacitor in the serial resonance circuit and the voltage V2 between both ends of the power transmission coil. In the second embodiment, the quality factor is determined by a half bandwidth method.

Figure 16:
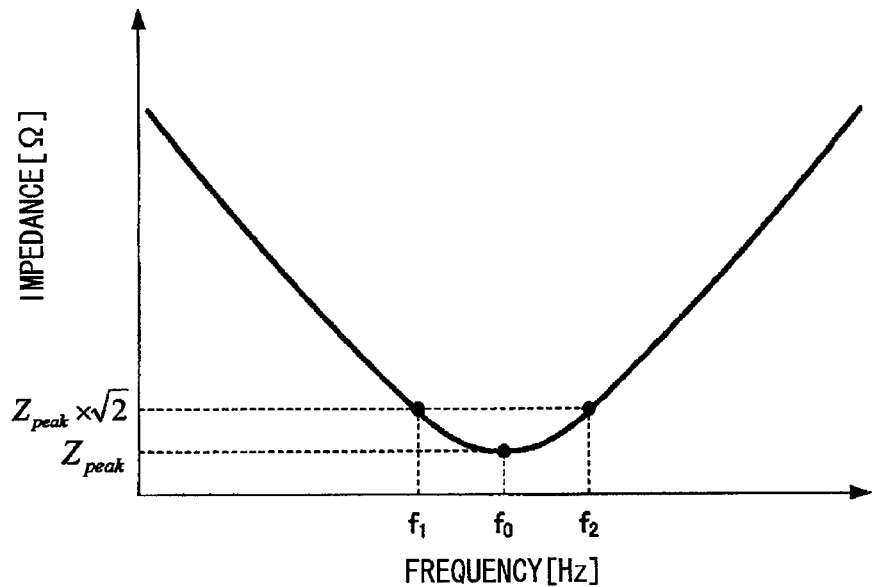
FIG. 16 is a graph illustrating a frequency characteristic of impedance in a serial resonance circuit according to a second embodiment of the disclosure.

In the half bandwidth method, in the case where a serial resonance circuit is configured, a quality factor is determined by an expression (7) from a band (between frequencies f1 and f2) in which the impedance is 12 times an absolute value of an impedance (Zpeak) at a resonance frequency $f_0$ as illustrated in a graph of FIG. 16.

[Numerical Expression 7]

$$Q = \frac{f_0}{f_2 - f_1} \tag{7}$$

Figure 17:
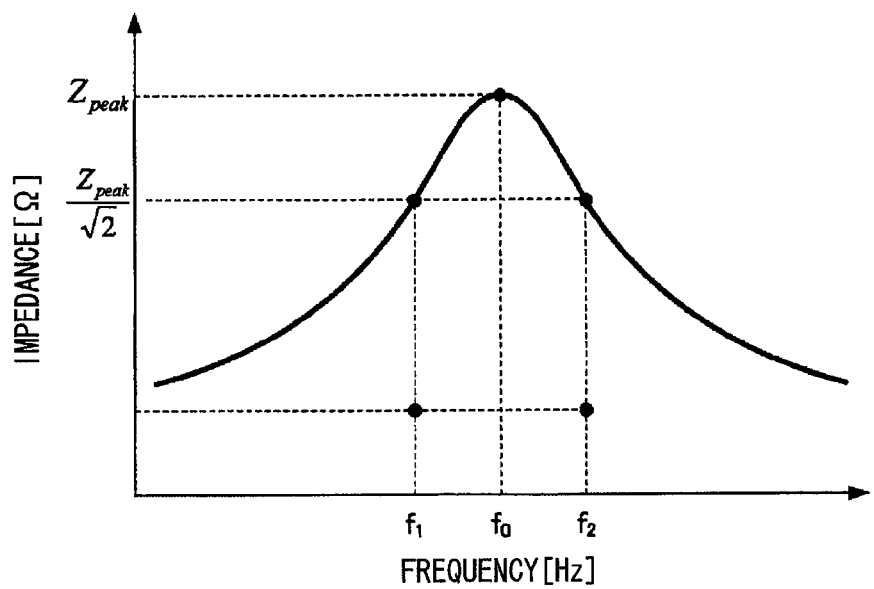
FIG. 17 is a graph illustrating a frequency characteristic of impedance in a parallel resonance circuit according to the second embodiment of the disclosure.

In addition, in the case where a parallel resonance circuit is configured, a quality factor is determined by the expression (7) from a band (between frequencies f1 and f2) in which the impedance is $1/\sqrt{2}$ times an absolute value of an impedance (Zpeak) at a resonance frequency $f_0$ as illustrated in a graph of FIG. 17.

3. Third Embodiment

Unlike the first and second embodiments, a third embodiment is an example where the arithmetic processing section 23A or 47A calculates a quality factor from a ratio of an imaginary component to a real component of impedance of a resonance circuit. In the third embodiment, the real component and the imaginary component of the impedance are determined with use of a self-balancing bridge circuit and a vector ratio detector.

Figure 18:
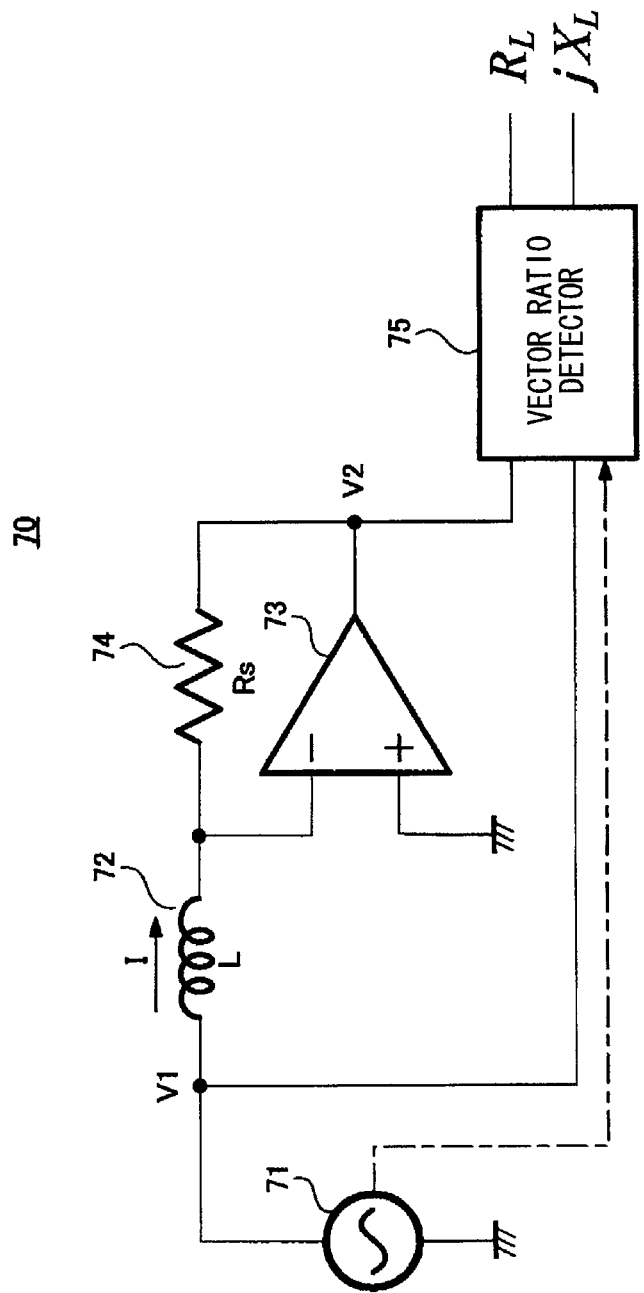
FIG. 18 is a circuit diagram for calculating a quality factor with use of a ratio of an imaginary component to a real component of impedance according to a third embodiment of the disclosure.

FIG. 18 is a circuit diagram of a self-balancing bridge for calculating a quality factor from the ratio of the imaginary component to the real component of the impedance, according to the third embodiment.

A self-balancing bridge circuit 70 illustrated in FIG. 18 has a configuration similar to a well-known inverting amplifier circuit. An inverting input terminal (−) of an inverting amplifier 73 is connected to a coil 72, and a non-inverting input terminal (+) is grounded. Then, a feedback resistance element 74 gives a negative feedback to the inverting input terminal (−) through an output terminal of the inverting amplifier 73. In addition, an output (a voltage V1) of an AC power source 71 which inputs an AC signal to the coil 72, and an output (a voltage V2) of the inverting amplifier 73 are input to a vector ratio detector 75. The coil 72 corresponds to the primary-side coil 15 in FIG. 5 or the secondary-side coil 31 in FIG. 6.

The self-balancing bridge circuit 70 operates so that the voltage at the inverting input terminal (−) is constantly zero by a function of the negative feedback. Moreover, a current flowing from the AC power source 71 to the coil 72 has large input impedance of the inverting amplifier 73 so that almost all current flow in the feedback resistance element 74. As a result, the voltage applied to the coil 72 is equal to the voltage V1 of the AC power source 71, and the output voltage of the inverting amplifier 73 is a product of a feedback resistance value Rs and a current I flowing through the coil 72. The feedback resistance value Rs is a known reference resistance value. Therefore, the impedance is determined by detecting the voltages V1 and V2 and calculating a ratio therebetween. The vector ratio detector 75 uses phase information of the AC power source 71 (illustrated by an alternate long and short dash line) in order to determine the voltages V1 and V2 as complex numbers.

In the embodiment, a real component $R_L$ and an imaginary component $X_L$ of impedance $Z_L$ of the resonance circuit are determined with use of the self-balancing bridge circuit 70, the vector ratio detector 75, and the like, and a quality factor is determined from the ratio. The following expressions (8) and (9) illustrate processes for determining a quality factor.

[Numerical Expression 8]

$$Z_L = R_L + jX_L = \frac{V1}{I} = \frac{V1}{V2} Rs \quad (8)$$

[Numerical Expression 9]

$$Q = \frac{X_L}{R_L} \quad (9)$$

4. Others

Incidentally, in the above-described first to third embodiments, description is made on an assumption of a non-contact power transmission system of a magnetic field resonance type. However, the disclosure is intended to perform detection of a foreign metal existing between a power transmission side and a power reception side, and improve detection accuracy, even when power feeding from the power transmission side to the power reception side is not performed. Therefore, the non-contact power transmission system is not limited to the magnetic field resonance type, and is applicable to an electromagnetic induction type with an increased coupling factor k and a lower quality factor.

Moreover, a power receiver may have a power transmission section and transmit power to a power transmitter through a secondary-side coil without contact. Alternatively, a power transmitter may have a load and receive power from a power receiver through a power transmission coil without contact.

Note that in the above-described first to third embodiments, a quality factor at a resonance frequency is measured. However, a frequency at which a quality factor is measured may not correspond to a resonance frequency. Even when a quality factor is measured with use of a frequency which is shifted within a tolerable range from a resonance frequency, detection accuracy of a foreign metal existing between a power transmission side and a power reception side may be improved by applying the technology of the disclosure.

Furthermore, approach of a conductor such as a metal to a primary-side coil or a secondary-side coil causes change not only in a quality factor but also in an L value, thereby shifting a resonance frequency. An electromagnetic coupling state may be detected with use of a shift amount of the resonance frequency due to the change of the L value, together with a quality factor.

In addition, a coupling factor k also changes when a foreign metal is sandwiched between a primary-side coil and a secondary-side coil. The electromagnetic coupling state may be detected with use of such change in the coupling factor k, together with the change in the quality factor.

Moreover, in the first to third embodiments of the disclosure, although an example of a coil which does not have a core is described as a primary-side coil and a secondary-side coil, a coil wound around a core having a magnetic body in a structure may be employed.

Furthermore, in the first to third embodiments of the disclosure, an example where a mobile phone is used as a mobile device on a secondary side is described. However, the mobile device on the secondary side is not limited thereto, and various mobile devices necessitating power such as a mobile music player and a digital still camera are applicable.

A series of processes according to the embodiment described above may be executed by hardware or software. When being executed by software, the series of processes is executed by a computer which incorporates programs configuring the software in a dedicated hardware, or a computer having installed programs for executing various kinds of functions. For example, programs configuring desired software may be executed by a general-purpose personal computer by installation.

Moreover, a recording medium in which program codes of software implementing the functions of the embodiments may be provided to a system or a device. It is needless to say that the functions are achievable by allowing a computer (or a control device such as a CPU) in the system or the device to read out and execute the program codes stored in the recording medium.

Examples of the recording medium providing the program codes in this case include a flexible disc, a hard disk, an optical disc, a magneto-optical disk, a CD-ROM, a CD-R, a magnetic tape, a non-volatile memory card, and a ROM.

Moreover, the program codes read out by the computer is executed to achieve the functions of the embodiments. In addition, based on instructions of the program codes, OS or the like operating on the computer performs a part or all of the actual processing. The case where the functions of the above-described embodiments are achieved by the processing is also acceptable.

Furthermore, in the specification, process steps describing processes in time series include processes performed in time series along a described order, and also processes which is not necessarily performed in time series but is performed in parallel or individually (for example, parallel processes or processes by objects).

It is to be understood that the disclosure is not limited to the above-described embodiments, and other various modifications and application examples may be made.

In other words, the examples of the above-described embodiments are preferred specific examples of the disclosure, and therefore various limitations suitable in technology may be attached. However, the technical scope of the disclosure is not limited to these embodiments unless otherwise specified in each description. For example, the used materials and used amount, the processing time, the processing order, the numerical conditions of the parameters, and the like described in the above description are merely preferred examples, and the dimensions, the shapes, and the positional relationships in the figure used for description are also given schematically.

Note that the present disclosure may be configured as follows.

(1) An energy receiver including:
a power receiver coil configured to wirelessly receive power transmitted from a power transmitter;
a detection section configured to detect a foreign object; and
a power storage section configured to supply power to the detection section during detection of the foreign object.

(2) The energy receiver of (1), further including:
a Q-value detection circuit connected to the power receiver coil,
wherein the detection section is configured to measure a quality factor related to the Q-value detection circuit.

(3) The energy receiver of (1), further including:
a control section configured to activate the detection section during suspension of power transmission to the power receiver coil using power stored in the power storage section.

(4) The energy receiver of (3), wherein the control section includes an arithmetic processing section and a determination section, the arithmetic processing section configured to (i) calculate a quality factor related to the power receiver coil, and (ii) output the quality factor to the determination section, the determination section configured to compare the quality factor with a threshold value for determining whether the foreign object is within a range of the power receiver coil.

(5) The energy receiver of (4), further including:
a memory configured to store the threshold value for determining whether the foreign object is within the range of the power receiver coil,
wherein,
the memory is non-volatile memory in communication with the control section, and the threshold value is obtained when the power receiver coil is substantially isolated from the foreign object.

(6) The energy receiver of (1), further including:
a switch in communication with the power storage section, the switch configured to (i) connect the power storage section and the detection section to provide power for detection of the foreign object during suspension of power transmission, and (ii) disconnect the power storage section and the detection section when the foreign object is not being detected.

(7) A detection method including:
charging a power storage section using power wirelessly received from a power receiver coil;
detecting whether a foreign object is within a range of the power receiver coil using a detection section; and
powering the detection section during detection of the foreign object using the power storage section.

(8) The detection method of (7), further including:
activating the detection section during suspension of power transmission to the power receiver coil using power stored in the power storage section.

(9) The detection method of (7), wherein,
the power receiver coil includes a Q-value detection circuit, and
the detecting whether the foreign object is within the range of the power receiver coil is based on a measurement by the detection section of a quality factor related to the Q-value detection circuit.

(10) The detection method of (9), wherein the charging of the power section includes receiving power wirelessly from a power transmitter based on power consumed during measurement of the quality factor.

(11) The detection method of (8), further including:
obtaining a threshold value for determining whether the foreign object is within the range of the receiver coil when the power receiver coil is isolated from the foreign object;
storing the threshold value in a non-volatile memory in communication with a control section;
calculating a quality factor using an arithmetic processing section of the control section; and
comparing the quality factor with the threshold value using a determination section of the control section.

(12) The detection method of (7), wherein the powering of the detection section includes (i) connecting the detection section to the power storage section using a switch so that power is provided to the power storage section during suspension of power transmission for detection of the foreign object, and (ii) disconnecting the power storage section and the detection section when the foreign object is not being detected.

(13) A power transmission system including:
a power transmitter configured to wirelessly transmit power to a power receiver,
wherein,
the power transmitter includes (i) a power transmission coil configured to transmit power to the power receiver, (ii) a power transmission section configured to supply an AC signal to the power transmission coil, and (iii) a power transmitter control section configured to control the supply of the AC signal from the power transmission section in response to a signal transmitted from the power receiver, and
the power receiver includes (i) a power receiver coil configured to wirelessly receive power from the power transmitter, (ii) a detection section configured to detect a foreign object, (iii) a power storage section configured to store the power received from the power transmitter, the power storage section operable to supply the power received to the detection section during detection of the foreign object, and (iv) a power receiver control section configured to operate the detection section and determine whether the foreign object is within a range of the power transmission coil.

(14) The power transmission system of (13), wherein,
the power receiver includes a Q-value detection circuit connected to the power receiver coil, and
the detection section is configured to measure a quality factor related to the Q-value detection circuit.

(15) The power transmission system of (13), wherein the power receiver control section is configured to activate the detection section during suspension of power transmission between the power transmitter and the power receiver using power stored in the power storage section.

(16) The system of (13), wherein,
the power receiver includes a memory configured to store a threshold value for determining whether the foreign object is between the power transmission coil and the power receiver coil, and
the memory is non-volatile memory in communication with the power receiver control section.

(17) The system of (13), wherein the power receiver includes a switch in communication with the power storage section, the switch configured to (i) connect the power storage section and the detection section to provide power during suspension of power transmission between the power transmitter and the power receiver during activation of the detection section, and (ii) disconnect the power storage section and the detection section when the detection section is not activated.

(18) A detection device including:
a power receiver coil configured to wirelessly receive power transmitted from a power transmitter;
a detection section configured to detect whether a foreign object is within a range of the power receiver coil; and
a power storage section configured to supply power to the detection section during detection of the foreign object.

(19) The detection device of (18), wherein,
the power receiver coil includes a Q-value detection circuit, and
the detection section is configured to measure a quality factor related to the Q-value detection circuit.

(20) The detection device of (18), further including:
a control section configured to activate the detection section during suspension of power transmission to the power receiver coil using power stored in the power storage section.

(21) The detection device of (19), further including:
a memory configured to store a threshold value obtained when the power receiver coil is isolated from the foreign object; and
a control section in communication with the memory, the control section configured to (i) calculate the quality factor using an arithmetic processing section of the control section, and (ii) compare the quality factor with the threshold value using a determination section of the control section.

(22) The detection method of (18), further including:
a switch configured to (i) connect the power storage and the detection section to provide power during suspension of power transmission to the power receiver coil during activation of the detection section, and (ii) disconnect the power storage section and the detection section when the detection section is not activated.

(23) An energy transmitter including:
a power transmission coil configured to wirelessly transmit power to a power receiver;
a detection section configured to detect a foreign object; and
a power storage section configured to supply power to the detection section during detection of the foreign object.

(24) The energy transmitter of (23), wherein the detection section is configured to measure a quality factor to determine whether the foreign object is within a range of the power transmission coil.

(25) The energy transmitter of (23), further including:
a control section configured to activate the detection section during suspension of power transmission from the power transmission coil using power stored in the power storage section.

(26) The energy transmitter of (24), further including:
a memory configured to store a threshold value for determining whether the foreign object is within the range of the power transmission coil,
wherein,
the memory is non-volatile memory in communication with the control section, and
the threshold value is obtained when the power transmission coil is substantially isolated from the foreign object.

(27) The energy transmitter of (23), further including:
a switch in communication with the power storage section, the switch configured to (i) connect the power storage section and the detection section to provide power during suspension of power transmission from the power transmission coil when the detection section is activated, and (ii) disconnect the power storage section and the detection section when the detection section is not activated.

(28) An energy receiver including:
a power receiver coil configured to wirelessly receive power transmitted from a power transmitter;
a detection section configured to detect a foreign object; and
a control section configured to activate the detection section during suspension of power transmission to the power receiver coil.

(29) The energy receiver of (28), further including:
a power storage section configured to supply power to the detection section during detection of the foreign object.

(30) The energy receiver of (28), further including:
a Q-value detection circuit connected to the power receiver coil,
wherein the detection section is configured to measure a quality factor related to the Q-value detection circuit.

(31) The energy receiver of (28), wherein the control section includes an arithmetic processing section and a determination section, the arithmetic processing section configured to (i) calculate a quality factor related to the power receiver coil, and (ii) output the quality factor to the determination section, the determination section configured to compare the quality factor with a threshold value for determining whether the foreign object is within a range of the power receiver coil.

(32) The energy receiver of (28), further including:
a memory configured to store the threshold value for determining whether the foreign object is within the range of the power receiver coil,
wherein,
the memory is non-volatile memory in communication with the control section, and the threshold value is obtained when the power receiver coil is substantially isolated from the foreign object.

(33) The energy receiver of (29) further including:
a switch in communication with the power storage section, the switch configured to (i) connect the power storage section and the detection section to provide power for detection of the foreign object during suspension of power transmission, and (ii) disconnect the power storage section and the detection section when the foreign object is not being detected.

(A) A detector including:
a resonance circuit including a secondary-side coil;
a detection section measuring a quality factor of the resonance circuit;
a power storage section charging power, from power received through the secondary-side coil from a primary-side coil, by an amount of power consumed during the quality factor measurement in the detection section; and
a control section operating the detection section, during suspension of power transmission from the primary-side coil, with use of the power charged in the power storage section.

(B) The detector according to (A), wherein the control section operates the detection section to measure the quality factor of the resonance circuit, and detects an electromagnetic coupling state between the secondary-side coil and the outside.

(C) The detector according to (B), further including:
a first switch section switching supply and suspension of the power to the power storage section, the power being received from the primary-side coil;
a second switch section provided between the power storage section and a load, and switching connection and disconnection between the power storage section and the load; and
a third switch section switching connection and disconnection between the resonance circuit and the detection section, wherein
the control section switches the first switch section to supply the power from the secondary-side coil to the power storage section, and thus charges the power storage section, and
after charging the power, in the power storage section, by an amount of power consumed during the quality factor measurement in the detection section, during the suspension of the power transmission from the primary-side coil, the control section switches the second switch section to disconnect the power storage section from the load, switches the third switch section to connect the resonance circuit and the detection section, and operates the detection section with use of the power charged in the power storage section to measure the quality factor of the resonance circuit.

(D) The detector according to (C), wherein the control section determines whether the current quality factor measurement is a first time measurement, and when the quality factor measurement is determined as the first time measurement, the control section allows the detection section to measure quality factors for measurement signals of a plurality of frequencies, compares a threshold with a maximum quality factor of the measured quality factors, and detects an electromagnetic coupling state between the secondary-side coil and the outside, based on the comparison result.

(E) The detector according to (D), wherein when it is determined that the current quality factor measurement is a second or later measurement, the control section allows the detection section to measure a quality factor with use of a measurement signal of a frequency at which the maximum quality factor is obtained in the previous quality factor measurement, compares the threshold and the quality factor measured at this time, and detects an electromagnetic coupling state between the secondary-side coil and the outside, based on the comparison result.

(F) The detector according to (E), wherein the control section compares the quality factor obtained in the second or latter quality factor measurement with the maximum quality factor obtained in the previous quality factor measurement to determine whether the quality factor measured at this time is within a predetermined range of the previous measured quality factor, and when the quality factor is not within the predetermined range, the control section allows the detection section to measure quality factors for measurement signals of a plurality of frequencies, compares the threshold with the maximum quality factor of the measured quality factors, and detects an electromagnetic coupling state between the secondary-side coil and the outside, based on the comparison result.

(G) The detector according to any one of (C) to (F), wherein
the power is charged in the power storage section by an amount of power enabling the detection section to measure a quality factor with use of a measurement signal of one frequency, and
the control section controls switching of the first switch section, the second switch section, and the third switch section to repeat the charge and the quality factor measurement alternately.

(H) The detector according to any one of (A) to (G), wherein the power storage section is a capacitor or a small secondary battery.

(I) A power receiver including:
a secondary-side coil;
a resonance circuit including the secondary-side coil;
a detection section measuring a quality factor of the resonance circuit;
a power storage section charging power, from power received through the secondary-side coil from a primary-side coil, by an amount of power consumed during the quality factor measurement in the detection section; and
a control section operating the detection section, during suspension of power transmission from the primary-side coil, with use of the power charged in the power storage section.

(J) A power transmitter including:
a primary-side coil transmitting power to a secondary-side coil;
a power transmission section supplying an AC signal to the primary-side coil; and
a control section controlling the supply of the AC signal from the power transmission section in response to a signal indicating an electromagnetic coupling state based on a quality factor of a power receiver, the signal being transmitted from the power receiver mounted with the secondary-side coil.

(K) A non-contact power transmission system including:
a power transmitter transmitting power by wireless; and
a power receiver receiving the power transmitted from the power transmitter,
wherein
the power receiver includes:
a resonance circuit including a secondary-side coil;
a detection section measuring a quality factor of the resonance circuit;
a power storage section charging power, from power received through the secondary-side coil from a primary-side coil, by an amount of power consumed during the quality factor measurement in the detection section; and a first control section operating the detection section, during suspension of power transmission from the primary-side coil, with use of the power charged in the power storage section, and the power transmitter includes:

the primary-side coil transmitting power to the secondary-side coil of the power receiver;

a power transmission section supplying an AC signal to the primary-side coil; and a second control section controlling the supply of the AC signal from the power transmission section in response to a signal indicating an electromagnetic coupling state based on a quality factor of the power receiver, the signal being transmitted from the power receiver.

(L) A detection method including:

charging power, in a power storage section of a power receiver in a non-contact power transmission system, by an amount of power consumed during quality factor measurement in a detection section of the power receiver, from power received from a primary-side coil of a power transmitter through a secondary-side coil of a resonance circuit, the resonance circuit being provided in the power receiver;

operating the detection section and acquiring a physical amount necessary for determining a quality factor of the resonance circuit, during suspension of power transmission from the primary-side coil, with use of the power charged in the power storage section; and calculating the quality factor from the physical amount necessary for determining the quality factor, by the power receiver or the power transmitter in the non-contact power transmission system.

As used herein, the terms "energy receiver" and "power receiver" may be used interchangeably. The terms "power transmission system" and "non-contact power transmission system" may be used interchangeably. The terms "detection device" and "detector" may be used interchangeably. The terms "energy transmitter" and "power transmitter" may be used interchangeably.

The present disclosure contains subject matter related to that disclosed in Japanese Priority Patent Application JP 2011-149465 filed in the Japan Patent Office on Jul. 5, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed:

1. An energy receiver comprising:
   power receiving circuitry including a receiver coil configured to wirelessly receive power transmitted from a power transmitter;
   detection circuitry directly connected to the power receiving circuitry, the detection circuitry comprising a Q factor detection circuit; and
   test signal generation circuitry directly connected to the power receiving circuitry;
   wherein,
      the detection circuitry is configured to determine a plurality of quality factor values for the power receiving circuit using the Q factor detection circuit and the test signal generation circuitry and then compare the determined plurality of quality factor values with a threshold quality factor value to detect presence of a foreign object, wherein when the foreign object is detected power receiving circuitry is configured to stop receiving power transmitted;
   a power storage section configured to supply power to the Q factor detection circuit during detection of the foreign object; and
   a communications unit in communication with the detection circuitry.

2. The energy receiver of claim 1, further comprising: a power regulator connected between the power storage section and the detection circuitry.

3. The energy receiver of claim 1, further comprising a control section that activates the detection section during suspension of wireless power transmission to the power receiver coil using power stored in the power storage section.

4. The energy receiver of claim 3, wherein the control section includes an arithmetic processing section and a determination section, the arithmetic processing section configured to (i) calculate the determined quality factor values related to the power receiver circuit, and (ii) output the determined quality factor values to the determination section, the determination section configured to compare the determined quality factor values with the threshold quality factor value and determine whether the foreign object is within a range of the power receiver coil.

5. The energy receiver of claim 4, further comprising:
   a memory configured to store the threshold quality factor value,
   wherein,
      the memory is non-volatile memory in communication with the control section, and
      the threshold quality factor value is obtained when the power receiver coil is substantially isolated from the foreign object.

6. The energy receiver of claim 1, further comprising a switch in communication with the power storage device, the switch positioned to (i) connect the power storage device and the power regulator to provide power for detection of the foreign object during suspension of wireless power transmission, and (ii) disconnect the power storage section and the detection section when the foreign object is not being detected.

7. A detection method comprising:
   charging a power storage device using power wirelessly received by a power receiver circuit including a power receiver coil;
   communicating with a wireless power transmitter to cause power transmitter to not transmit power, and then provide power stored by the power storage device to a detection circuit directly connected the power receiver; and
   detecting whether a foreign object is within a range of the power receiver coil by
   generating by a test signal generation circuit directly connected to the power receiver one or more test signals having different frequencies and
   determining various quality factor values for the power receiver circuit using Q factor detection circuitry within the detection circuit and the one or more test signals having different frequencies, and then comparing the determined quality factor values to a threshold quality factor value; and
   stopping power reception of the power receiver when the foreign object is detected.

8. The detection method of claim 7, further comprising: activating detection circuitry during suspension of wireless power transmission to the power receiver coil using power stored in the power storage section.

9. The detection method of claim 7, wherein:
each test signal has a unique frequency; and
Q factor detection of whether the foreign object is within the range of the power receiver coil Q factor depends on which, if any, of the determined quality factor values exceeds the threshold quality factor value.

10. The detection method of claim 9, wherein the charging of the power section includes receiving power from the power receiver circuit based on power consumed during the determination of the determined quality factor values.

11. The detection method of claim 8, further comprising:
obtaining the threshold quality factor value when the power receiver coil is isolated from the foreign object;
storing the threshold quality factor value in a non-volatile memory in communication with a control section;
calculating each determined quality factor value using an arithmetic processing section of the control section; and
comparing the determined quality factor values with the threshold quality factor value using a determination section of the control section.

12. The detection method of claim 7, wherein the powering of the detection section includes (i) connecting the detection section to the power storage section using a switch so that power is provided to the power storage section during suspension of wireless power transmission for detection of the foreign object, and (ii) disconnecting the power storage section and the detection section when not detecting for the foreign object.

13. A power transmission system comprising a power transmitter configured to wirelessly transmit power to a power receiver, wherein:
the power transmitter includes
(i) a power transmission coil to wirelessly transmit power to the power receiver,
(ii) an AC signal power supply connected to the power transmission coil,
(iii) a power transmitter communications section, and
(iv) a power transmitter control section to control the supply of the AC signal to the power transmission coil in response to a signal transmitted from the power receiver and received via the power transmitter communications section, and
the power receiver includes
(i) power receiving circuitry including a receiver coil configured to wirelessly receive power transmitted from a power transmitter,
(ii) detection circuitry comprising Q factor detection circuitry directly connected to the power receiving circuitry,
(iii) test signal generation circuitry directly connected to power receiving circuitry,
(iv) detection circuitry configured to determine a plurality of quality factor values for the power receiving circuitry using the Q factor detection circuitry and the test signal generation circuitry and then compare the determined plurality of quality factor values with a threshold quality factor value to detect presence of a foreign object, wherein when the foreign object is detected the power receiving circuitry is configured to stop receiving power transmitted,
(v) a power storage section configured to supply power to the detection circuitry during detection of the foreign object, and
(vi) a power receiver communications unit in communication with the detection circuitry.

14. The power transmission system of claim 13, wherein the detection circuitry, the test signal generation circuitry and the power storage section include switches controlled by control circuitry in the detection circuitry.

15. The power transmission system of claim 13, wherein the power receiver control section is configured to cause the power receiver communications controller to communicate a signal to the power transmitter and to activate the detection section during suspension of wireless power transmission between the power transmitter and the power receiver using power stored in the power storage section.

16. The system of claim 13, wherein,
the power receiver includes a memory configured to store the threshold quality factor value, and
the memory is a non-volatile memory in communication with the power receiver control section.

17. The system of claim 13, wherein the power receiver includes a switch in communication with the power storage section, the switch coupled to (i) connect the power storage device to transfer power to the power regulator to provide power during suspension of wireless power transmission between the power transmitter and the power receiver during activation of the detection section, and (ii) disconnect the power storage device and when the detection section is not activated.

18. A detection device comprising:
power receiving circuitry including a power receiver coil configured to wirelessly receive power transmitted from a power transmitter;
detection circuitry comprising Q factor detection circuitry directly connected to the power receiving circuitry;
test signal generation circuitry capable of generating test signals at different frequencies;
detection circuitry configured to determine a plurality of quality factor values for the power receiving section using the Q factor detection circuitry and test signals having different frequencies and to compare the determined quality factor values with a threshold quality factor value to detect presence of a foreign object, wherein when the foreign object is detected the power receiving circuitry is configured to stop receiving power transmitted; and
a communications unit connected to the detection circuitry.

19. The detection device of claim 18, comprising a power storage section configured to supply power to the detection section during detection of the foreign object, the power storage section having a power storage device that is selectively coupled to the power receiving section and storing power received from the power receiving section.

20. The detection device of claim 19, further comprising a control section configured to activate the detection circuitry during suspension of wireless power transmission to the power receiver coil using power stored in the power storage device.

21. The detection device of claim 19, further comprising:
a memory configured to store the threshold quality factor value obtained when the power receiver coil is isolated from the foreign object; and
the control section in communication with the memory, the control section configured to (i) calculate the determined quality factor values using an arithmetic processing section of the control section, and (ii) compare the determined quality factor values with the threshold quality factor value using a determination section of the control section.

22. The detection device of claim 19, further comprising:
a switch configured to (i) connect the power storage device to cause transfer of power stored on the power storage to the detection circuitry to provide power during suspension of wireless power transmission to the power receiver coil during activation of the detection circuitry, and (ii) disconnect the power storage device when the detection section is not activated.

* * * * *